United States Patent
Tomioka

(10) Patent No.: US 10,471,528 B2
(45) Date of Patent: Nov. 12, 2019

(54) WIRE ELECTRICAL DISCHARGE MACHINE AND DISPLAY METHOD

(71) Applicant: FANUC CORPORATION, Yamanashi (JP)

(72) Inventor: Ryuunosuke Tomioka, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 7 days.

(21) Appl. No.: 15/973,765

(22) Filed: May 8, 2018

(65) Prior Publication Data

US 2018/0326523 A1 Nov. 15, 2018

(30) Foreign Application Priority Data

May 12, 2017 (JP) ................. 2017-095521

(51) Int. Cl.
*B23H 7/20* (2006.01)
*B23H 7/06* (2006.01)
*B23H 7/26* (2006.01)
*G05B 19/406* (2006.01)
(Continued)

(52) U.S. Cl.
CPC ............. *B23H 7/20* (2013.01); *B23H 7/06* (2013.01); *G05B 19/406* (2013.01); *B23H 7/26* (2013.01); *B23H 11/003* (2013.01); *B23H 2400/00* (2013.01); *B23H 2500/20* (2013.01); *G05B 2219/42327* (2013.01); *G05B 2219/45221* (2013.01); *G05B 2219/50308* (2013.01)

(58) Field of Classification Search
CPC ........ B23H 2500/20; B23H 7/26; B23H 7/32; G05B 2219/45221; G05B 2219/45043; G05B 2219/50331

USPC .................................................. 700/114, 162
See application file for complete search history.

(56) References Cited

U.S. PATENT DOCUMENTS

| | | | | |
|---|---|---|---|---|
| 4,998,003 A | * | 3/1991 | Kawanabe | ............... B23H 7/10 219/69.12 |
| 6,138,056 A | | 10/2000 | Hardesty et al. | |
| 9,541,914 B2 | | 1/2017 | Nishikawa et al. | |

(Continued)

FOREIGN PATENT DOCUMENTS

| | | |
|---|---|---|
| CN | 103391827 A | 11/2013 |
| CN | 103990876 A | 8/2014 |

(Continued)

OTHER PUBLICATIONS

English Abstract and Machine Translation for Japanese Publication No. JPH02-131821 A, published May 21, 1990, 9 pgs.

(Continued)

*Primary Examiner* — Michael J Brown
(74) *Attorney, Agent, or Firm* — Fredrikson & Byron, P.A.

(57) ABSTRACT

A wire electrical discharge machine includes: a wire electrode cumulative moving time calculator for calculating a value correlated to a wire electrode cumulative moving time as a cumulative value of time for which a wire electrode has moved in each of multiple wire electrode moving regions which are defined by dividing a movable range of the wire electrode moving relative to a worktable; and a display control unit for displaying on a display unit the information on values correlated to the wire electrode cumulative moving time for respective wire electrode moving regions.

12 Claims, 18 Drawing Sheets

(51) Int. Cl.
  *B23H 7/32* (2006.01)
  *B23H 11/00* (2006.01)

(56) References Cited

U.S. PATENT DOCUMENTS

| | | |
|---|---|---|
| 2007/0182359 A1 | 8/2007 | Wahler |
| 2013/0325164 A1 | 12/2013 | Wwatanabe et al. |
| 2014/0295737 A1* | 10/2014 | Kosuge ................ B24B 37/005 451/5 |
| 2015/0144599 A1 | 5/2015 | Kouda |

FOREIGN PATENT DOCUMENTS

| | | |
|---|---|---|
| JP | 59115124 A | 7/1984 |
| JP | 2131821 A | 5/1990 |
| JP | 2279217 A | 11/1990 |
| JP | 10202433 A | 8/1998 |
| JP | 2012200854 A | 10/2012 |
| JP | 2015104756 A | 6/2015 |

OTHER PUBLICATIONS

English Abstract and Machine Translation for Japanese Publication No. JPH02-279217 A, published Nov. 15, 1990, 7 pgs.
English Abstract and Machine Translation for Japanese Publication No. JPS59-115124 A, published Jul. 3, 1984, 6 pgs.
English Abstract for Japanese Publication No. 2015104756 A, published Jun. 8, 2015, 2 pgs.
English Abstract and Machine Translation for Japanese Publication No. 2012-200854 A, published Oct. 22, 2012, 15 pgs.
English Abstract for Chinese Publication No. 103990876 A, published Aug. 20, 2014, 1 pg.
English Abstract for Chinese Publication No. 103391827 A, published Nov. 13, 2013, 2 pgs.
English Abstract and Machine Translation for Japanese Publication No. 10-202433 A, published Aug. 4, 1998, 8 pgs.
Extended Search Report dated Jan. 7, 2019 in related EP Application No. 18171448.6, 6 pgs.

* cited by examiner

WIRE ELECTRICAL DISCHARGE MACHINE AND DISPLAY METHOD

CROSS-REFERENCE TO RELATED APPLICATION

This application is based upon and claims the benefit of priority from Japanese Patent Application No. 2017-095521 filed on May 12, 2017, the contents of which are incorporated herein by reference.

BACKGROUND OF THE INVENTION

Field of the Invention

The present invention relates to a wire electrical discharge machine for performing electrical discharge machining on a workpiece and a method for displaying information on the wire electrical discharge machine.

Description of the Related Art

Japanese Laid-Open Patent Publication No. 2012-200854 discloses a wire electrical discharge machine that moves a worktable horizontally by guide rails and drive motors.

SUMMARY OF THE INVENTION

When an operator sets a workpiece on the worktable, the operator often sets it in a particular place on the worktable. In this case, while the workpiece is being machined, the worktable is moved such that the wire electrode relatively moves with respect to the workpiece within a specific range including the area where the workpiece is placed, so that the worktable is mostly moved inside a particular range. As a result, there is a risk that the drive mechanisms such as ball screw mechanisms, the linear guides and others wear in the specific portions faster than other places, hence it becomes impossible to assure the machine accuracy of the workpiece. In the technique described in Japanese Laid-Open Patent Publication No. 2012-200854, there is no disclosure of a means for prompting the operator to set a workpiece at a place other than a specific range on the worktable. As a result, when the operator continually sets the workpieces in a specific range, a problem would occur with the specific portions locally worn in the drive mechanisms.

The present invention has been devised to solve the above problem, it is therefore an object of the present invention to provide a wire electrical discharge machine and a display method that can offer the operator the information on the cumulative value of moving time for which the wire electrode has moved relative to the worktable in each of multiple moving regions on the worktable.

One aspect of the present invention resides in a wire electrical discharge machine for implementing electrical discharge machining on a workpiece by applying voltage across an electrode gap formed between a wire electrode and the workpiece to generate electric discharge, comprising: a worktable on which the workpiece is set; a drive mechanism configured to relatively move the wire electrode and the worktable; a wire electrode cumulative moving time calculator configured to calculate a value correlated to a wire electrode cumulative moving time as a cumulative value of time for which the wire electrode has moved in each of wire electrode moving regions which are defined by dividing a movable range of the wire electrode moving relative to the worktable into multiple wire electrode moving regions; and a display control unit configured to display on a display unit information on values correlated to the wire electrode cumulative moving time for respective wire electrode moving regions.

According to the present invention, it is possible to offer the operator the information on the cumulative value of moving time for which the wire electrode has moved relative to the worktable, for each of the multiple moving regions on the worktable.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the present invention will be described using embodiments of the invention. The invention defined in the claims should not be limited by the following embodiments. Not all combinations of features described in the embodiments are necessarily essential to the solving means of the invention.

First Embodiment

Configuration of Wire Electric Discharge Machine

Figure 1:
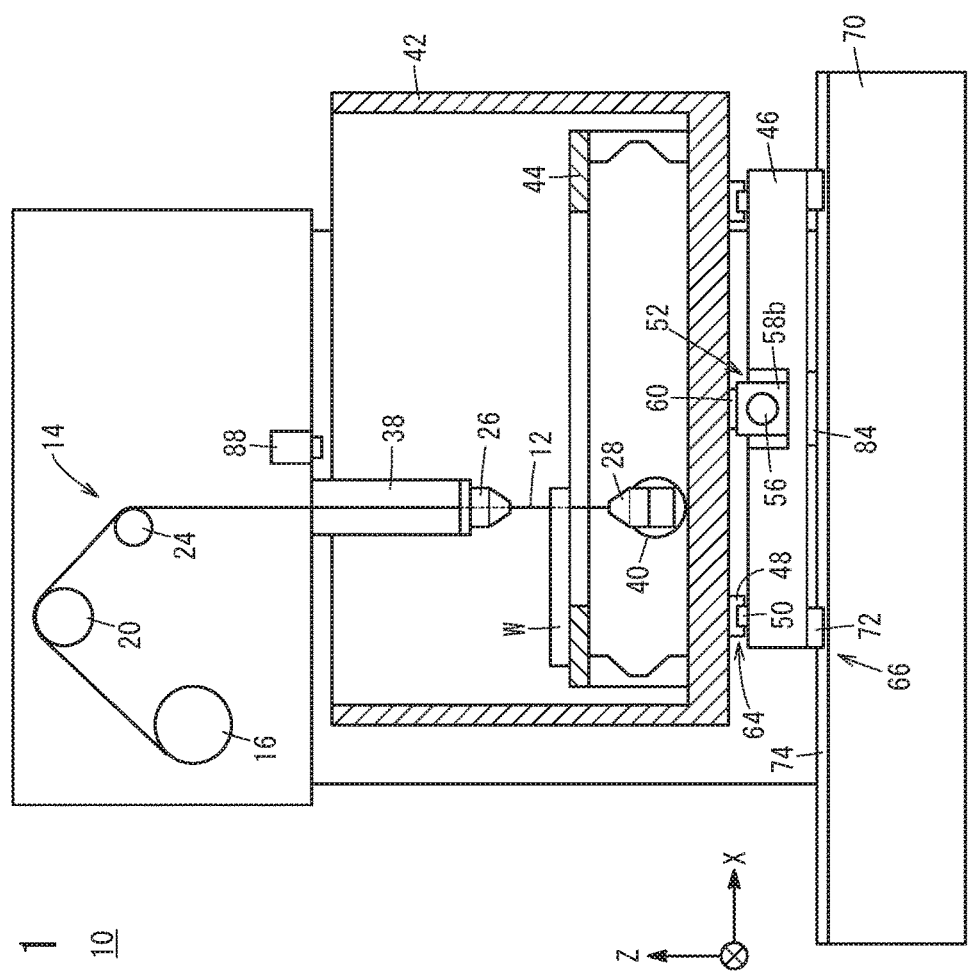
FIG. 1 is a schematic diagram showing a configuration of a wire electrical discharge machine.
Figure 2:
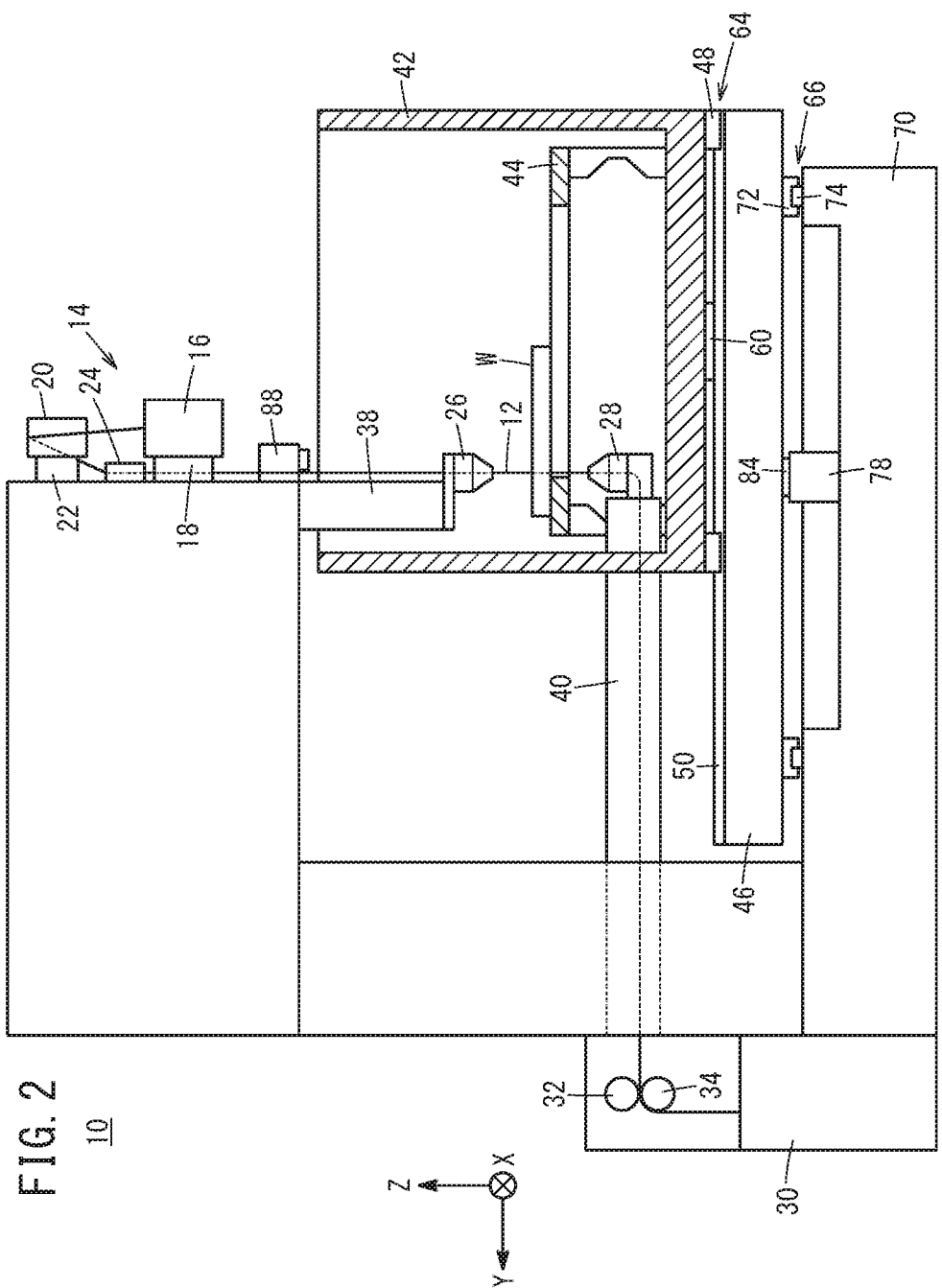
FIG. 2 is a schematic diagram showing a configuration of a wire electrical discharge machine.
Figure 3:
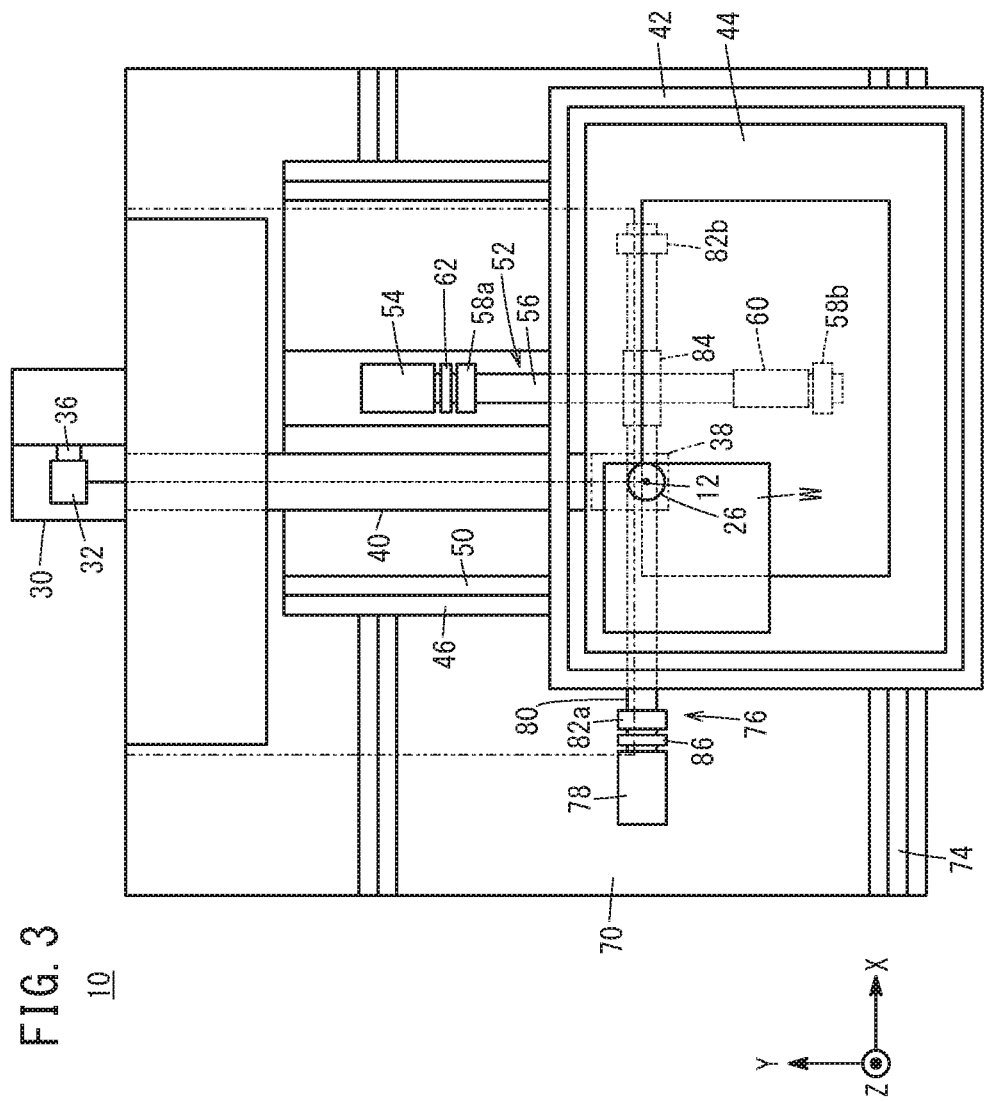
FIG. 3 is a schematic diagram showing a configuration of a wire electrical discharge machine.

FIGS. 1, 2 and 3 are schematic views showing a configuration of a wire electrical discharge machine 10 of the present embodiment. FIG. 1 is a front view of the wire electrical discharge machine 10, FIG. 2 is a side view of the wire electrical discharge machine 10, and FIG. 3 is a top view of the wire electrical discharge machine 10. Hereinafter, an axis extending in the left-to-right direction in FIG. 1 is defined as the X-axis, an axis orthogonal to the X-axis on a horizontal plane is defined as the Y-axis and the axis perpendicular to the X-axis and the Y-axis is defined as the Z-axis. In FIG. 1, the right direction is the positive X-axis direction, the upper direction is the positive Z-axis direction, and the left direction in FIG. 2 is the positive Y-axis direction.

The wire electrical discharge machine 10 is a machine tool which performs electrical discharge machining on a workpiece W by applying voltage across a gap between a wire electrode 12 and the workpiece W to generate electric discharge. The wire electrode 12 is formed of, for example, tungsten-based, copper alloy-based, brass-based metal or the like. On the other hand, the material of the workpiece W is, for example, an iron-based material or a tungsten carbide material.

The wire electrical discharge machine 10 includes a wire conveying mechanism 14 for conveying the wire electrode 12. The wire conveying mechanism 14 includes a wire bobbin 16 on which the wire electrode 12 is wound, a torque motor 18 for applying a torque to the wire bobbin 16, a brake roller 20 for applying braking force by friction to the wire electrode 12, a braking motor 22 for applying braking torque to the brake roller 20, a guide roller 24 for guiding the wire electrode 12, an upper wire guide 26 disposed above the workpiece W for guiding the wire electrode 12, a lower wire guide 28 for guiding the wire electrode 12 below the workpiece W, a feed roller 32 and a pinch roller 34 for collecting the wire electrode 12 into a wire collection box 30 and a torque motor 36 for applying torque to the feed roller 32. In this configuration, the wire electrode 12 can run in the negative Z-axis direction from the upper wire guide 26 to the lower wire guide 28.

The upper wire guide 26 is supported by a Z-axis drive mechanism 38. The Z-axis drive mechanism 38 includes an unillustrated Z-axis motor to move the upper wire guide 26 in the Z-axis direction. The lower wire guide 28 is supported by an arm 40 extended from the wire collection box 30.

The wire electrical discharge machine 10 includes a work-pan 42 capable of storing a (dielectric) working fluid such as deionized water or oil used for electrical discharge machining of the workpiece W. A worktable 44 on which the workpiece W is set is arranged in the work-pan 42. The work-pan 42 is mounted movably in the Y-axis direction relative to the saddle 46 via a linear guide 64. The linear guide 64 includes guide blocks 48 provided on an undersurface (the surface on the negative Z-axis direction side) of the work-pan 42, and a pair of guide rails 50 arranged extending in the Y-axis direction on an upper surface (the surface on the positive Z-axis direction side) of the saddle 46. The guide blocks 48 are engaged with the guide rails 50 so that the work-pan 42 can move in the Y-axis direction relative to the saddle 46.

A ball screw mechanism 52 is provided on the upper surface of the saddle 46 between the two guide rails 50. The ball screw mechanism 52 converts the rotational motion of the Y-axis motor 54 into a linear motion in the Y-axis direction and transmits it to the work-pan 42. The ball screw mechanism 52 includes a screw shaft 56 arranged so as to extend in the Y-axis direction, bearings 58a, 58b rotatably supporting the screw shaft 56 and a nut 60 that is fixed to the undersurface of the work-pan 42 and moves in the Y-axis direction as the screw shaft 56 rotates. By driving the Y-axis motor 54, the worktable 44 can be moved along the Y-axis. The Y-axis motor 54 is provided with a Y-axis resolver 62. The Y-axis resolver 62 detects the amount of rotation of the Y-axis motor 54 per a predetermined period of time. From the amount of rotation of the Y-axis motor 54, it is possible to obtain the position, speed and acceleration of the worktable 44 moving on the Y-axis.

The saddle 46 is mounted movably in the X-axis direction relative to the bed 70 via a linear guide 66. The linear guide 66 includes guide blocks 72 arranged on the undersurface (the surface on the negative Z-axis direction side) of the saddle 46, and a pair of guide rails 74 arranged extending in the X-axis direction on the top surface (the surface on the positive Z-axis direction side) of the bed 70. The guide blocks 72 are guided by the guide rails 74 so that the saddle 46 can move in the X-axis direction relative to the bed 70.

A ball screw mechanism 76 is provided on the upper surface of the bed 70 between the two guide rails 74. The ball screw mechanism 76 converts the rotational motion of the X-axis motor 78 into a linear motion in the X-axis direction and transmits it to the saddle 46. The ball screw mechanism 76 includes a screw shaft 80 arranged so as to extend in the X-axis direction, bearings 82a, 82b rotatably supporting the screw shaft 80, and a nut 84 that is fixed to the undersurface of the saddle 46 and moves in the X-axis direction as the screw shaft 80 turns. By driving the X-axis motor 78, the worktable 44 can be moved along the X-axis. The X-axis motor 78 is provided with an X-axis resolver 86. The X-axis resolver 86 detects the amount of rotation of the X-axis motor 78 per a predetermined period of time. From the amount of rotation of the X-axis motor 78, it is possible to obtain the position, speed and acceleration of the worktable 44 moving on the X-axis.

The wire electrical discharge machine 10 has a camera 88 for capturing an image of the interior of the work-pan 42. By analyzing the image taken by the camera 88, it is possible to determine the relative position between the worktable 44 and the wire electrode 12 and the position at which the workpiece W is set on the worktable 44.

Configuration of Control Device

Figure 4:
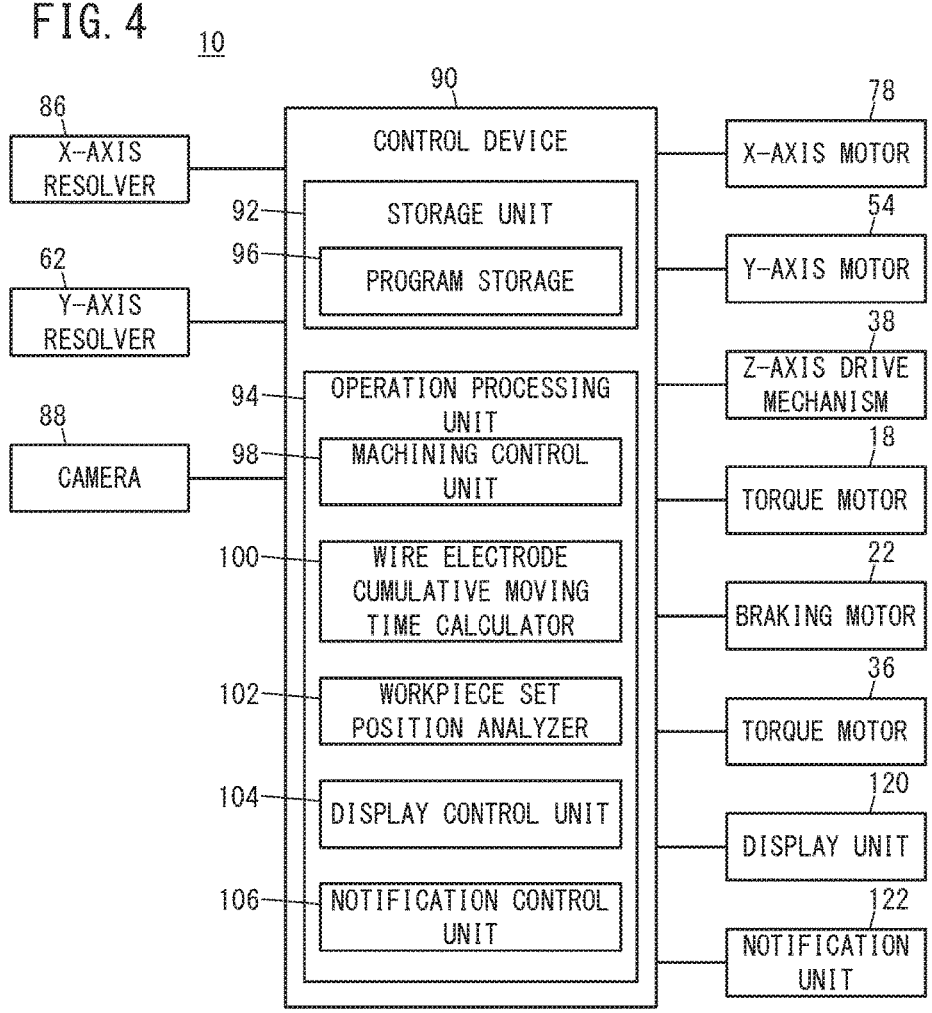
FIG. 4 is a block diagram showing a configuration of a control system of a wire electrical discharge machine.

FIG. 4 is a block diagram showing a configuration of a control system of the wire electrical discharge machine 10. The wire electrical discharge machine 10 has a control device 90 for controlling respective motors and others. The control device 90 has a storage unit 92 and an operation processing unit 94. The storage unit 92 may be a hard disk, semiconductor memory/or the like and have a program storage 96 that stores a numerical control (NC) program and the like. The operation processing unit 94 is composed of a processor, a memory and others, and performs various operational and control processes and the like. The operation processing unit 94 includes a machining control unit 98, a wire electrode cumulative moving time calculator 100, a workpiece set position analyzer 102, a display control unit 104 and a notification control unit 106.

The machining control unit 98 controls the wire conveying mechanism 14 (the torque motor 18, the braking motor 22, the torque motor 36), the X-axis motor 78, the Y-axis motor 54 and the Z-axis drive mechanism 38 so as to machine the workpiece W into a machining shape specified by the NC program.

The wire electrode cumulative moving time calculator 100 receives image input of the interior of the work-pan 42 captured by the camera 88 and calculates the cumulative moving time of the wire electrode 12 moving relative to the worktable 44 from the image input. The cumulative moving time of the wire electrode 12 moving relative to the worktable 44 will be described in detail later.

The workpiece set position analyzer 102 receives image input of the interior of the work-pan 42 from the camera 88 and determine the set position of the workpiece W on the worktable 44 from the image input.

The display control unit 104 outputs command signals to the display unit 120, for example, a liquid crystal display or the like so as to make it display characters, symbols, numerals, images and others. The notification control unit 106 outputs a command signal to a notification unit 122, for example, a speaker, to notify the operator by sound or the like.

Wire Electrode Cumulative Moving Time

Figure 5:
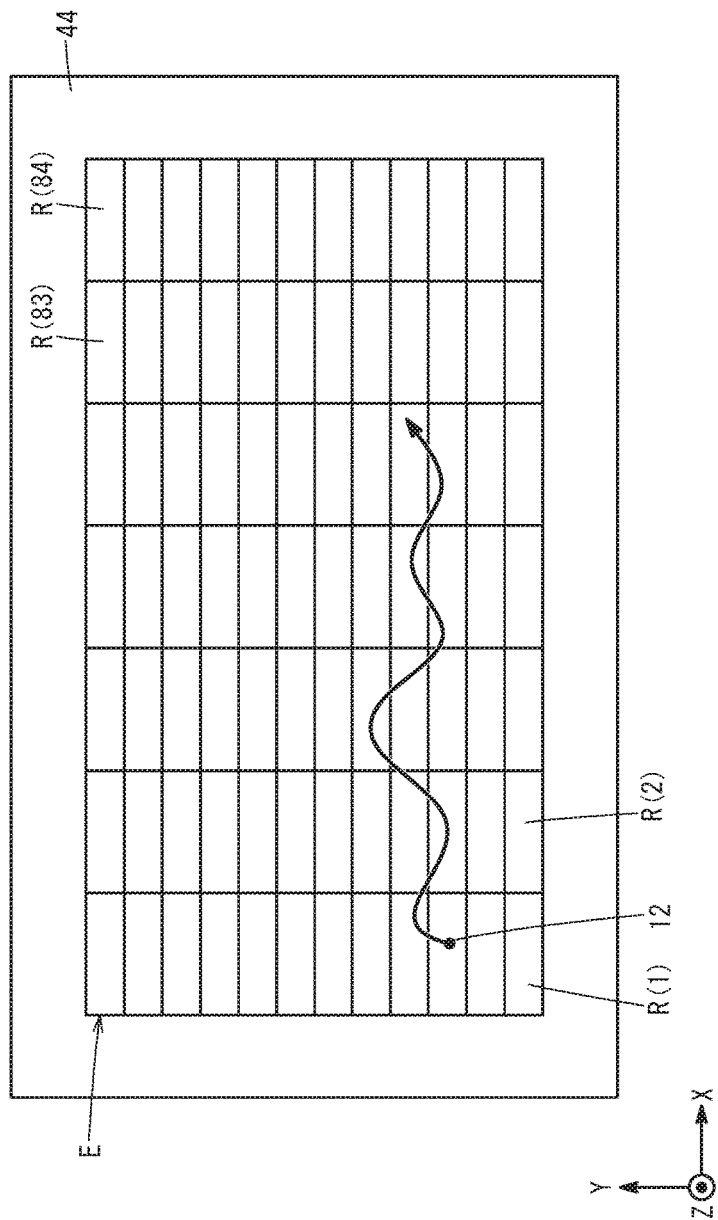
FIG. 5 is a diagram for explaining the movement of a wire electrode relative to a worktable.

FIG. 5 is a diagram illustrating the movement of the wire electrode 12 relative to the worktable 44. In the wire electrical discharge machine 10 of the present embodiment, the worktable 44 moves on a horizontal plane. As the upper wire guide 26 moves on the U-axis parallel to the X-axis and on the V-axis parallel to the Y-axis, the wire electrode 12 also moves on the horizontal plane. However, it is assumed in this case that the wire electrode 12 does not move on the horizontal plane.

Though the worktable 44 actually moves on the horizontal plane, the wire electrode 12 appears to move as seen from the worktable 44, as shown in FIG. 5. In the wire electrode cumulative moving time calculator 100, the range (movable range E) in which the wire electrode 12 can move within the frame of the worktable 44 is divided into seven in the X-axis direction and twelve in the Y-axis direction, so as to form 84 wire electrode moving regions R(1) to R(84). With this configuration, the time (wire electrode moving time) during which the wire electrode 12 is moving within each of the wire electrode moving regions R(1) to R(84) is added up over a predetermined period to calculate the cumulative moving time (wire electrode cumulative moving time) of the wire electrode 12 moving relative to the worktable 44. The predetermined period may be set as appropriate, for example, a period from the first activation of the wire electrical discharge machine 10 up to the present, or a period from the maintenance of the ball screw mechanisms 52, 76 and the linear guides 64, 66 up to the present.

The moving path of the wire electrode 12 relative to the worktable 44 can be obtained from the image in the work-pan 42 captured by the camera 88. The wire electrode cumulative moving time calculator 100 determines the wire electrode moving time in each of the wire electrode moving regions R(1) to R(84) from the image of the interior of the work-pan 42 taken by the camera 88. Here, the wire electrode moving time is the time in which the wire electrode 12 is moving relative to the worktable 44 and the time during which the wire electrode 12 is not moving relative to the worktable 44 will not be included.

The moving path of the worktable 44 in the X-axis direction and the Y-axis direction can be obtained from the amount of rotation of the X-axis motor 78 detected by the X-axis resolver 86 and the amount of rotation of the Y-axis motor 54 detected by the Y-axis resolver 62, and the moving path of the wire electrode 12 relative to the worktable 44 can also be obtained. Based on the amount of rotation of the X-axis motor 78 detected by the X-axis resolver 86 and the amount of rotation of the Y-axis motor 54 detected by the Y-axis resolver 62, the wire electrode cumulative moving time calculator 100 may calculate the cumulative moving time of the wire electrode in wire electrode moving regions R(1) to R(84).

Display of Wire Electrode Cumulative Moving Time

Figure 6:
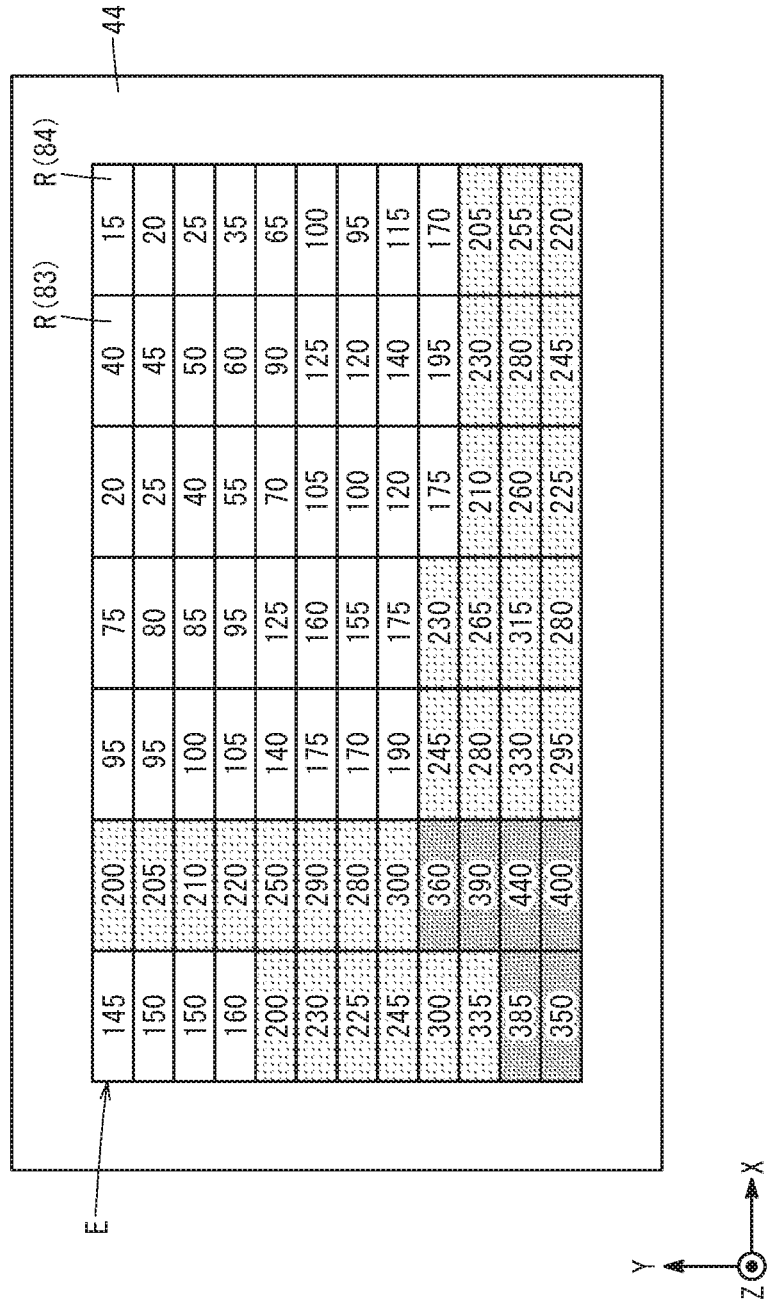
FIG. 6 is a diagram for explaining the movement of a wire electrode relative to a worktable.

In the present embodiment, the cumulative moving time of the wire electrode in each of the wire electrode moving regions R(1) to R(84) is displayed on the display unit 120. FIG. 6 is a diagram for explaining the movement of the wire electrode 12 relative to the worktable 44. As shown in FIG. 6, a map showing the locations of the wire electrode moving regions R(1) to R(84) relative to the worktable 44 is depicted on the display unit 120 so as to display the wire electrode cumulative moving time in each of wire electrode moving regions R(1) to R(84). Further, the display is changed based on the magnitude of the wire electrode cumulative moving time. For example, among the wire electrode moving regions R(1) to R(84), those (the range indicated by the dense dots in FIG. 6) having a wire electrode cumulative moving time of "350" or greater are displayed with red background while those (the range indicated by the thin dots in FIG. 6) having a wire electrode cumulative moving time of "200" or greater are displayed with yellow background.

Display Notification Control Processing

Figure 7:
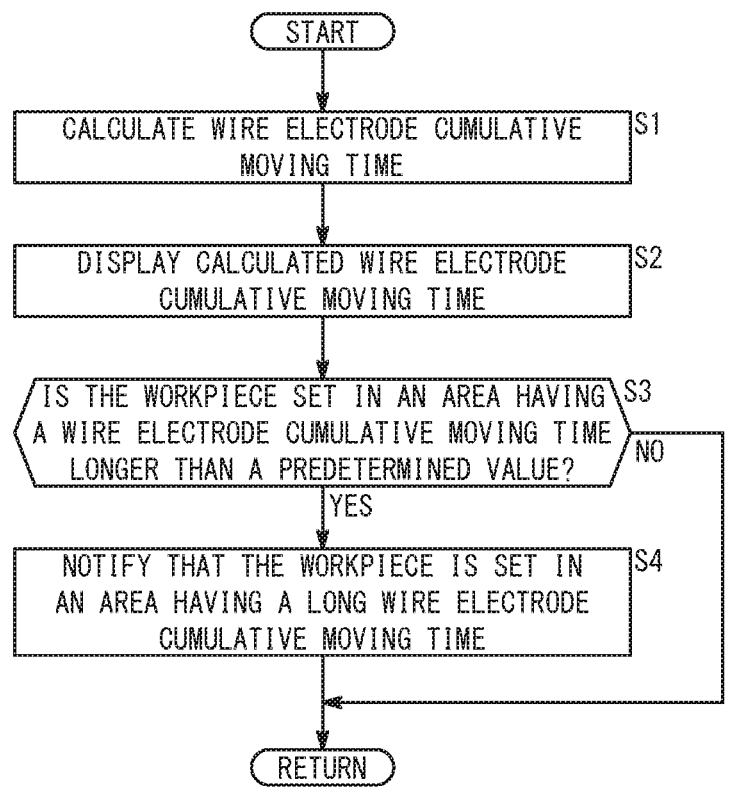
FIG. 7 is a flow chart showing a processing flow of display on a display unit and notification by a notification unit, performed in a controller.

FIG. 7 is a flowchart showing a processing flow of display on the display unit 120 and notification by the notification unit 122, performed in the control device 90. At step S1, the wire electrode cumulative moving time calculator 100 calculates the wire electrode cumulative moving time in each of the wire electrode moving regions R(1) to R(84), and the control proceeds to step S2.

At step S2, the display control unit 104 outputs a command signal to cause the display unit 120 to display the wire electrode cumulative time value in each position of the wire electrode moving regions R(1) to R(84) in the worktable 44 as shown in FIG. 6, and the controls goes to step S3.

At step S3, the notification control unit 106 receives information on the set position of the workpiece W on the worktable 44 obtained by the workpiece set position analyzer 102, and determines whether or not the workpiece W is set on the worktable 44 in an area where the wire electrode cumulative moving time is equal to or greater than a predetermined value (for example, "350"). When the workpiece W is set on the worktable 44 in the area where the wire electrode cumulative moving time is equal to or greater than the predetermined value, the control goes to step S4. When the workpiece W is set on the worktable 44 in other than the area where wire electrode cumulative moving time is equal to or greater than the predetermined value, the control is terminated.

At step S4, the notification control unit 106 outputs a command signal to the notification unit 122 so as to inform the operator that the workpiece W has been set on the worktable 44 in an area where the wire electrode cumulative moving time is long, then, the control is terminated.

Operation and Effect

When the operator sets the workpiece W on the worktable 44, the operator often mounts the workpiece W in a certain specific place on the worktable 44. Since, in machining the workpiece W, the worktable 44 is moved so that the wire electrode 12 moves relatively to the workpiece W within a particular range including the area where the workpiece W is placed, the worktable 44 is often driven within the specific area. As a result, there is a risk that certain positions of the threaded shafts 56, 80 and the guide rails 50, 74 locally wear more than other places so that it becomes impossible to ensure the machine accuracy of the workpiece W.

To deal with this, in the present embodiment, the value of wire electrode cumulative moving time for which the wire electrode 12 has moved in each of the wire electrode moving regions R(1) to R(84) on the worktable 44 is calculated so as to display the wire electrode cumulative moving time for wire electrode moving regions R(1) to R(84) in a map showing the locations of the wire electrode moving regions R(1) to R(84), on the display unit 120. Accordingly, it is possible to offer the operator the information on the cumulative moving time of the wire electrode for wire electrode moving regions R(1) to R(84) through the display on the display unit 120. Further, the display on the display unit 120 can give the operator the information on the distribution of the areas where the wire electrode cumulative moving time is long and the areas where the wire electrode cumulative moving time is short in an easy-to-understand manner. As a result, the operator, as checking the display on the display unit 120, can set the workpiece W in the area where the wire electrode cumulative moving time is short, whereby it is possible to reduce local unevenness of the wire electrode cumulative moving time for every region. Thus, it is possible to suppress the wear of specific areas in the screw shafts 56, 80 and the guide rails 50, 74 from being accelerated.

Further, in the present embodiment, the display unit 120 displays the wire electrode moving regions R(1) to R(84) each containing a value of the wire electrode cumulative moving time, with different background colors depending on the value of wire electrode cumulative moving time. Thus, it is possible to provide the operator with information on the distribution of the areas where the wire electrode cumulative moving time is high or low so that the operator can grasp it at a glance.

Moreover, in the present embodiment, when the workpiece W is set on the worktable 44 in an area where the wire electrode cumulative moving time is equal to or greater than a predetermined value, the notification unit 122 notifies the operator of this fact. Thus, it is possible to alert the operator, or make the operator recognize that the workpiece W has been placed in an area where the wire electrode cumulative moving time is long.

Second Embodiment

In the first embodiment, based on the image captured by the camera 88, or the amount of rotation of the X-axis motor 78 detected by the X-axis resolver 86 and the amount of rotation of the Y-axis motor 54 detected by the Y-axis resolver 62, the wire electrode cumulative moving time is calculated. In the present embodiment, from the amount of rotation of the X-axis motor 78 detected by the X-axis resolver 86, the cumulative time value of the worktable 44 moving in the X-axis direction (hereinafter also referred to as the X-axis worktable cumulative moving time) is determined. Further, from the amount of rotation of the Y-axis motor 54 detected by the Y-axis resolver 62, the moving cumulative time value of the worktable 44 moving in the Y-axis direction (hereinafter also referred to as the Y-axis worktable cumulative moving time) is obtained. Further, a wire electrode moving time index correlated to the wire electrode cumulative moving time is determined from the X-axis worktable cumulative moving time and the Y-axis worktable cumulative moving time. The mechanical configuration of the wire electrical discharge machine 10 of the present embodiment is the same as that of the first embodiment, except that the configuration of the control device 90 is partly different.

Configuration of Control Device

Figure 8:
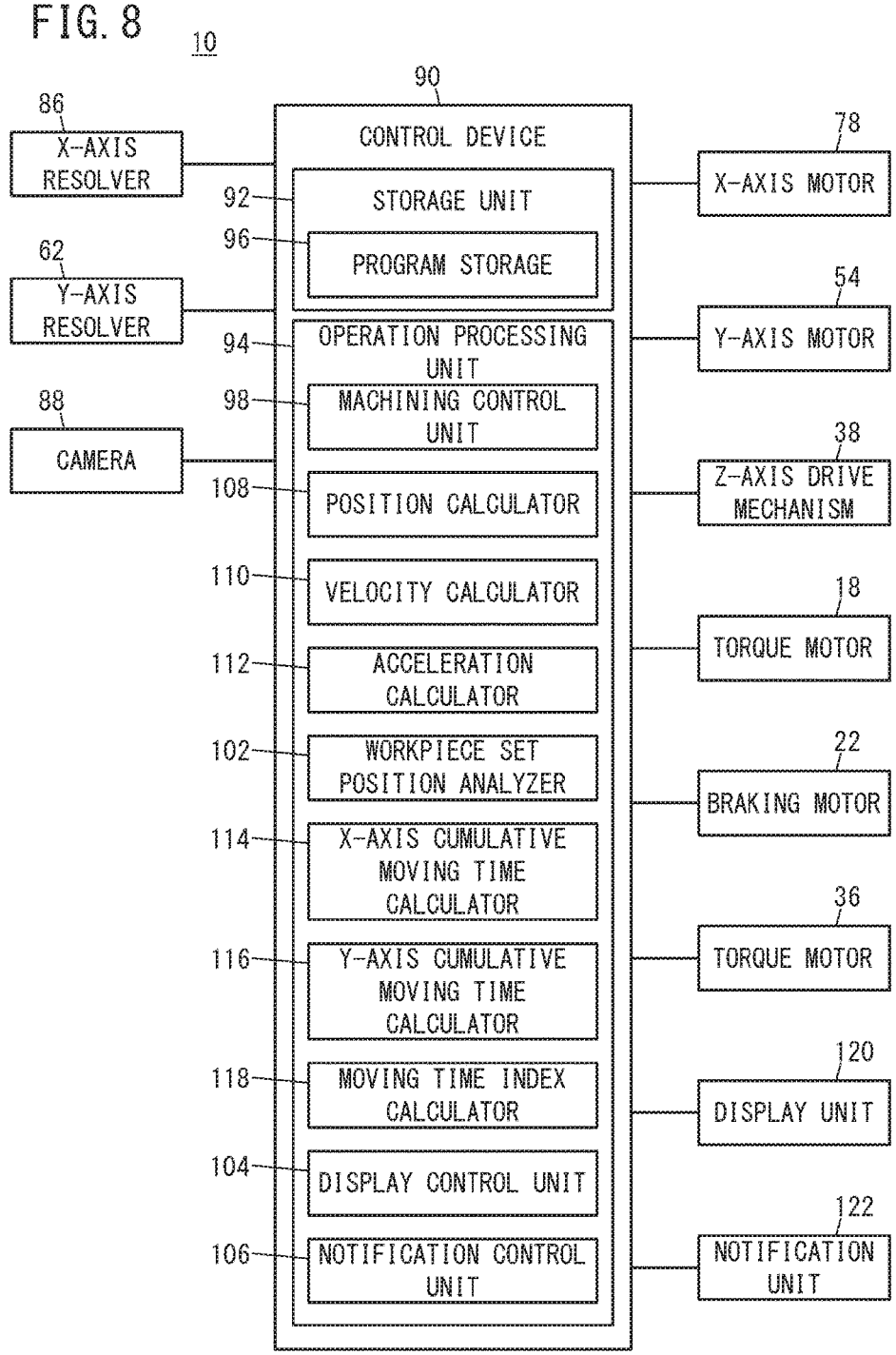
FIG. 8 is a block diagram showing a configuration of a control system of a wire electrical discharge machine.

FIG. 8 is a block diagram showing a configuration of a control system of the wire electrical discharge machine 10. In the present embodiment, the configuration of the operation processing unit 94 of the control device 90 is partly different from that of the first embodiment. As the difference from the first embodiment, the operation processing unit 94 includes a position calculator 108, a speed calculator 110, an acceleration calculator 112, an X-axis cumulative moving time calculator 114, a Y-axis cumulative moving time calculator 116 and a moving time index calculator 118. On the other hand, the wire electrode cumulative moving time calculator 100 of the operation processing unit 94 of the first embodiment is not included in the operation processing unit 94 of this embodiment.

The position calculator 108 receives information on the amount of rotation of the X-axis motor 78 from the X-axis resolver 86 and calculates the moving position of the worktable 44 with respect to the X-axis from the amount of rotation of the X-axis motor 78. Further, the position calculator 108 inputs information on the amount of rotation of the Y-axis motor 54 from the Y-axis resolver 62, and calculates the moving position of the worktable 44 with respect to the Y-axis from the amount of rotation of the Y-axis motor 54. The amount of rotations of the X-axis motor 78 and the Y-axis motor 54 detected by the X-axis resolver 86 and the Y-axis resolver 62 are relative amounts. For example, the position calculator 108 defines a position where the worktable 44 is moved to the ends in the negative X-axis direction and in the negative Y-axis direction as the initial position, and calculates the moving position of the worktable 44 with respect to the X-axis and the Y-axis, by measuring the amounts of rotation of the X-axis motor 78 and the Y-axis motor 54.

The speed calculator 110 receives information on the amount of rotation of the X-axis motor 78 from the X-axis resolver 86 and calculates the speed of the worktable 44 moving in the X-axis direction from the amount of rotation of the X-axis motor 78. In addition, the speed calculator 110 receives information on the amount of rotation of the Y-axis motor 54 from the Y-axis resolver 62, and calculates the speed of the worktable 44 moving in the Y-axis direction from the amount of rotation of the Y-axis motor 54.

The acceleration calculator 112 receives information on the amount of rotation of the X-axis motor 78 from the X-axis resolver 86 and calculates the acceleration of the worktable 44 moving in the X-axis direction from the amount of rotation of the X-axis motor 78. In addition, the acceleration calculator 112 receives information on the amount of rotation of the Y-axis motor 54 from the Y-axis resolver 62, and calculates the acceleration of the worktable 44 moving in the Y-axis direction from the amount of rotation of the Y-axis motor 54.

The X-axis cumulative moving time calculator 114 calculates the X-axis worktable cumulative moving time. The Y-axis cumulative moving time calculator 116 calculates the Y-axis worktable cumulative moving time. The moving time index calculator 118 calculates a wire electrode moving time index. The X-axis worktable cumulative moving time, the Y-axis worktable cumulative moving time and the wire electrode moving time index will be detailed later.

Worktable Cumulative Moving Time

The X-axis worktable cumulative moving time and the Y-axis worktable cumulative moving time are the cumulative values of time in which the worktable 44 has been moving within a predetermined area on the X-axis and the Y-axis for a predetermined period of time, respectively.

Figure 9:
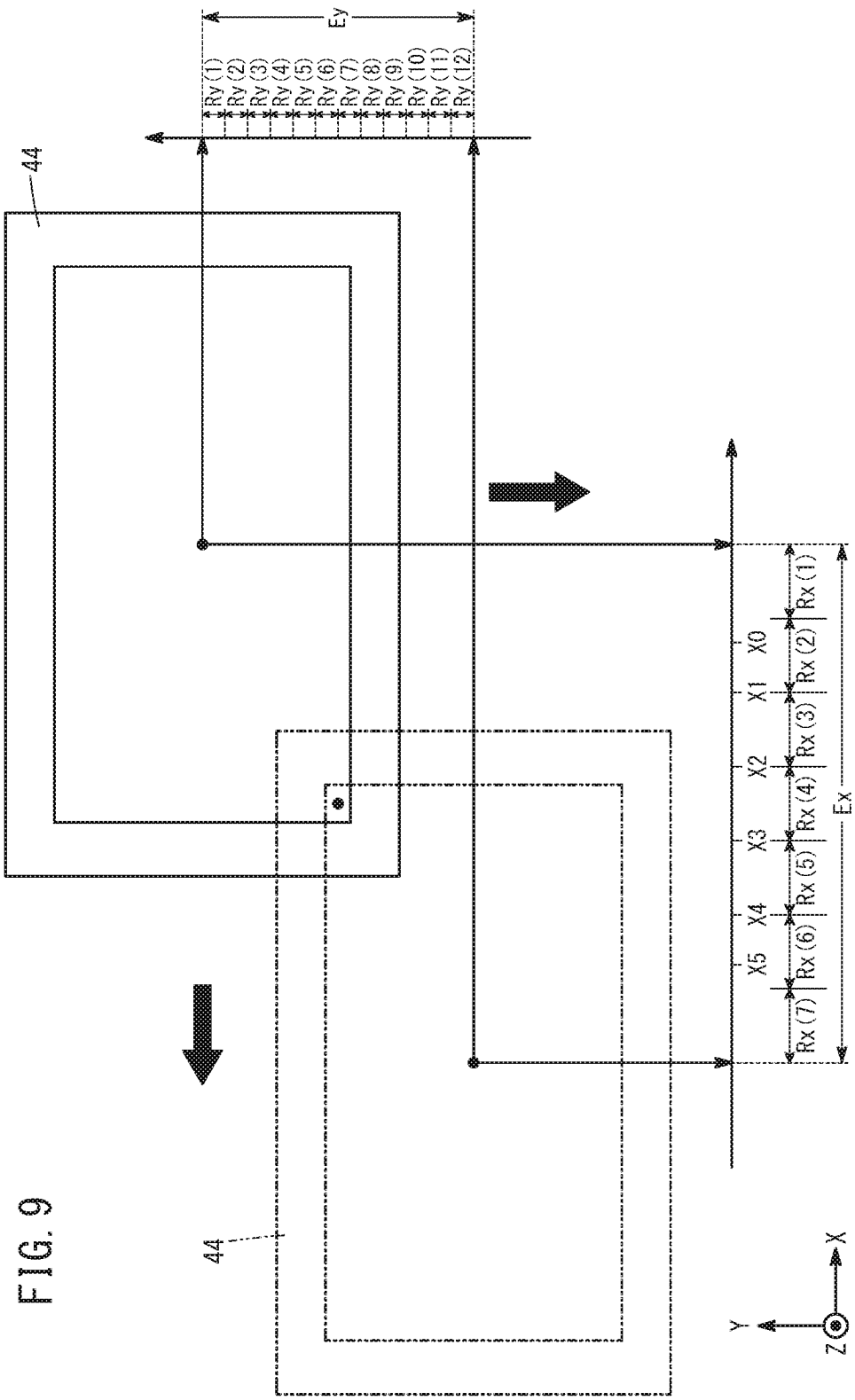
FIG. 9 is a diagram showing the movement of a worktable corresponding to the movement of a wire electrode relative to the worktable.

FIG. 9 is a diagram showing the movement of the worktable 44 corresponding to the movement of the wire electrode 12 relative to the worktable 44. In FIG. 9, the worktable 44 indicated by the solid line shows a state in which the worktable 44 is set such that the wire electrode 12 is positioned at a point closest to the negative side in the X-axis direction and closest to the negative side in the Y-axis direction, within the frame of the worktable 44. The worktable 44 indicated by the dotted line shows a state in which the worktable 44 is set such that the wire electrode 12 is positioned at a point closest to the positive side in the X-axis direction and closest to the positive side in the Y-axis direction, within the frame of the worktable 44.

The movable range of the worktable 44 in the X-axis direction, corresponding to the movable range of the wire electrode 12 in the X-axis direction within the frame of the worktable 44 is denoted as Ex, and the movable range of the worktable 44 in the Y-axis direction, corresponding to the movable range of the wire electrode 12 in the Y-axis direction within the frame of the worktable 44 is denoted as Ey.

To begin with, the X-axis cumulative moving time calculator 114 divides the movable range Ex into seven worktable moving regions Rx(1) to Rx(7), and the Y-axis cumulative moving time calculator 116 divides the movable range Ey into twelve worktable moving regions Ry(1) to Ry(12).

Then, the X-axis cumulative moving time calculator 114 determines the moving time (which will be also referred to as X-axis cumulative moving time) in which the worktable 44 is moving in each of the worktable moving regions Rx(1) to Rx(7). The Y-axis cumulative moving time calculator 116 determines the moving time (which will be also referred to as Y-axis cumulative moving time) in which the worktable 44 is moving in each of the worktable moving regions Ry(1) to Ry(12). The method of determining the X-axis worktable moving time in each of worktable moving regions Rx(1) to Rx(7) will be explained hereinbelow. The Y-axis worktable moving time in each of worktable moving regions Ry(1) to Ry(12) may be obtained in the same manner as the X-axis worktable moving time is.

Figure 10:
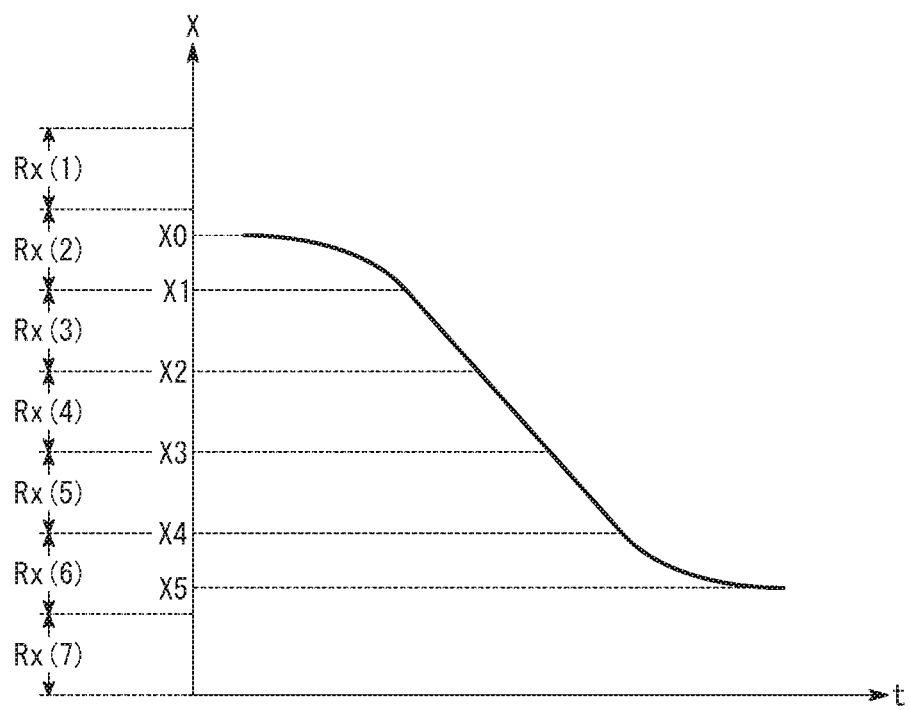
FIG. 10 is a graph showing the relationship between time and the moving position of a worktable when the worktable moves in the X-axis direction.
Figure 11:
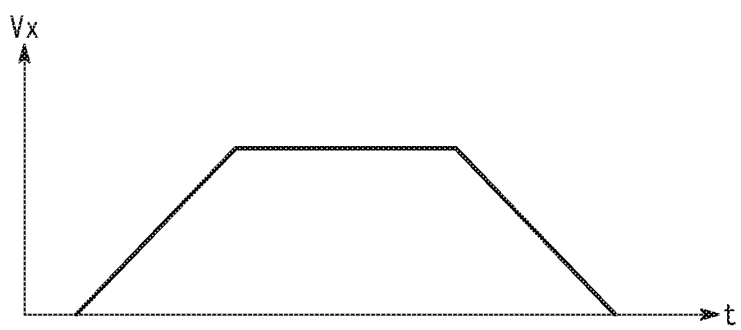
FIG. 11 is a graph showing the change of the moving speed of a worktable over time.
Figure 12:
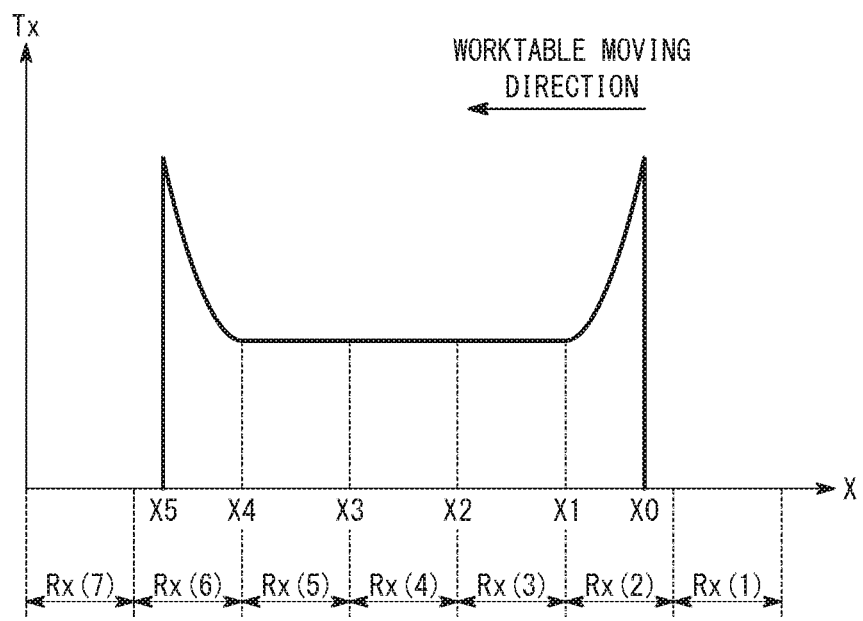
FIG. 12 is a graph showing the time for the worktable to move along the X-axis with respect to the moving position of the worktable.

The X-axis worktable moving time in each of worktable moving regions Rx(1) to Rx(7) can be obtained from the position X of the worktable 44 moving on the X-axis and the speed Vx of the worktable 44 moving in the X-axis direction. FIG. 10 is a graph showing the relationship between time t and the moving position X when the worktable 44 moves in the X-axis direction from the moving position X0 to the moving position X5 shown in FIG. 9. When the worktable 44 moves as shown in the graph of FIG. 10, the change of the moving speed Vx of the worktable 44 with respect to time is given as shown in the graph of FIG. 11. In a section where the moving speed Vx of the worktable 44 is low, the X-axis worktable moving time Tx for the section becomes long, whereas in a section where the moving speed Vx of the worktable 44 is high, the X-axis worktable moving time Tx becomes short. Therefore, the X-axis worktable moving time Tx with respect to the moving position X of the worktable 44 is given as shown in the graph of FIG. 12. The X-axis worktable moving time Tx is time when the worktable 44 is moving, and the time during which the worktable 44 is not moved is excluded from calculation of the X-axis worktable moving time Tx.

Figure 13:
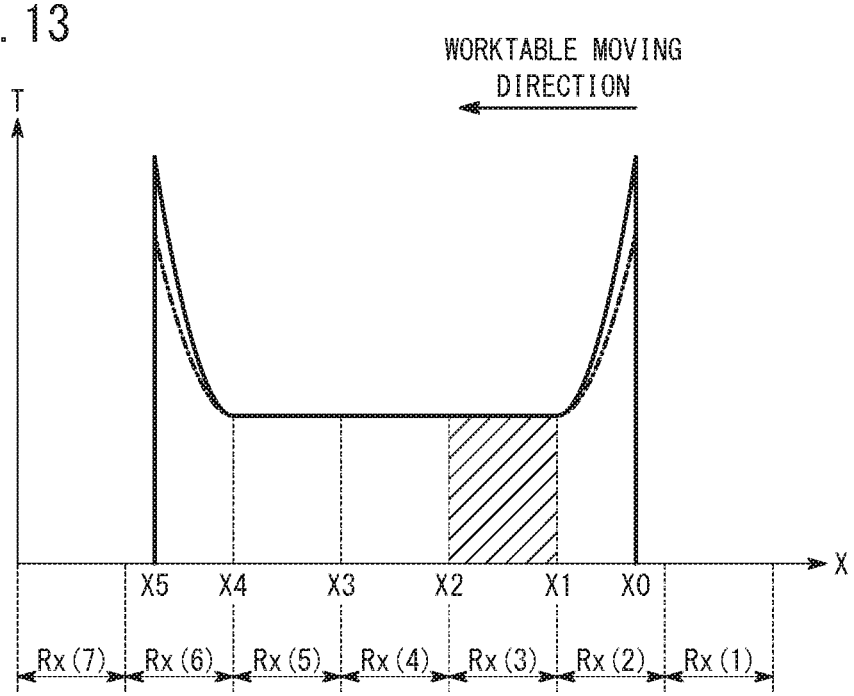
FIG. 13 is a graph showing the modified time for the worktable to move with respect to the moving position of the worktable.

Further, the X-axis cumulative moving time calculator 114 corrects the X-axis worktable moving time Tx according to the moving acceleration of the worktable 44. In this case, the value of the X-axis worktable moving time Tx between the moving position X0 and the moving position X1 where the worktable 44 is accelerated and the value of the X-axis worktable moving time Tx between the moving position X4 and the moving position X5 where the worktable 44 is decelerated are multiplied by a predetermined coefficient (e.g., "1.2"). FIG. 13 is a graph showing the relationship between the corrected moving time T and the moving position X of the worktable 44. The one-dot chain line in FIG. 13 shows the moving time T before correction. The predetermined coefficient may be varied according to the moving acceleration of the worktable 44. For example, the coefficient may be set at "1.2" for low acceleration or deceleration mode, at "1.4" for high acceleration mode, and at "1.1" at the time of startup or stop.

The X-axis worktable moving time Tx in each of worktable moving regions Rx(1) to Rx(7) can be calculated by integrating the X-axis worktable moving time Tx with respect to the moving position X of the worktable 44 in each respective region Rx(1) to Rx(7). For example, the X-axis worktable moving time Tx of the worktable moving region Rx(3) takes a value obtained by integrating the X-axis worktable moving time Tx in the section from the moving position X1 to the moving position X2, which is indicated by the hatched area in FIG. 13.

Next, the X-axis cumulative moving time calculator 114 accumulates the X-axis worktable moving time Tx for each of worktable moving regions Rx(1) to Rx(7) over the predetermined period and sets the result as the cumulative moving time (the X-axis worktable cumulative moving time) of the worktable 44 moving inside each of worktable moving regions Rx(1) to Rx(7).

Likewise, the Y-axis cumulative moving time calculator 116 accumulates the Y-axis worktable moving time Ty for each of worktable moving regions Ry(1) to Ry(12) over the predetermined period and sets the result as the cumulative moving time (the Y-axis worktable cumulative moving time) of the worktable 44 moving inside each of worktable moving regions Ry(1) to Ry(12).

Figure 14:
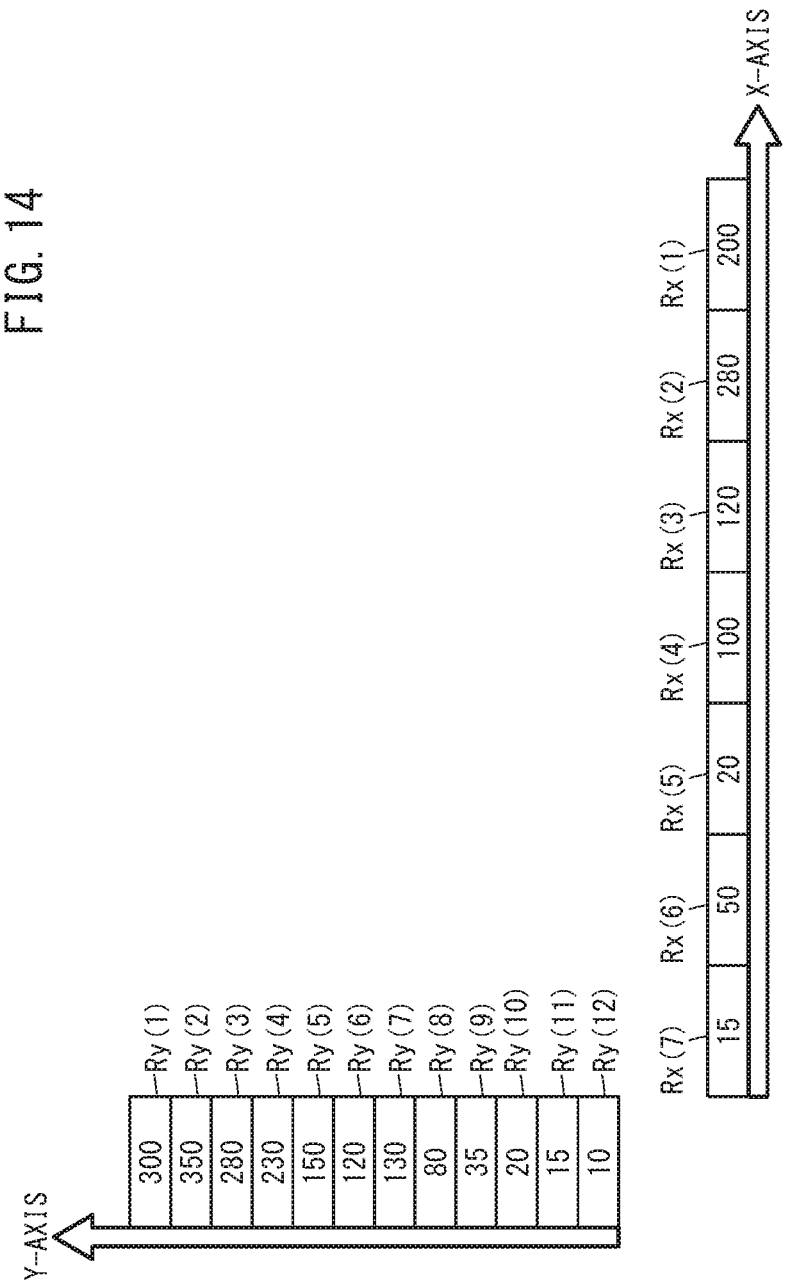
FIG. 14 is a diagram showing the X-axis worktable cumulative moving time for each of worktable moving regions along the X-axis and the Y-axis worktable cumulative moving time for each of worktable moving regions along the Y-axis.

FIG. 14 is a diagram showing the X-axis worktable cumulative moving time for worktable moving regions Rx(1) to Rx(7) in the X-axis direction and the Y-axis worktable cumulative moving time for worktable moving regions Ry(1) to Ry(12) in the Y-axis direction. As shown in FIG. 14, in the diagram, the locations of the worktable moving regions Rx(1) to Rx(7) on the X-axis and the worktable moving regions Ry(1) to Ry(12) on the Y-axis are shown with associated X-axis worktable cumulative moving time and Y-axis worktable cumulative moving time. For example, by displaying a diagram as shown in FIG. 14 on the display unit 120, it is possible for the operator to grasp the areas where the X-axis worktable cumulative moving time and the Y-axis worktable cumulative moving time are long. Further, it is possible to grasp the risk that the portions of the screw shafts 56, 80 and the guide rails 50, 74 corresponding to the region where the X-axis worktable cumulative moving time and the Y-axis worktable cumulative moving time are long are locally worn out more than the other areas.

Wire Electrode Moving Time Index

The wire electrode moving time index and the wire electrode cumulative moving time of the first embodiment have correlation. The wire electrode moving time index is obtained from the X-axis worktable cumulative moving time and the Y-axis worktable cumulative moving time.

Figure 15:
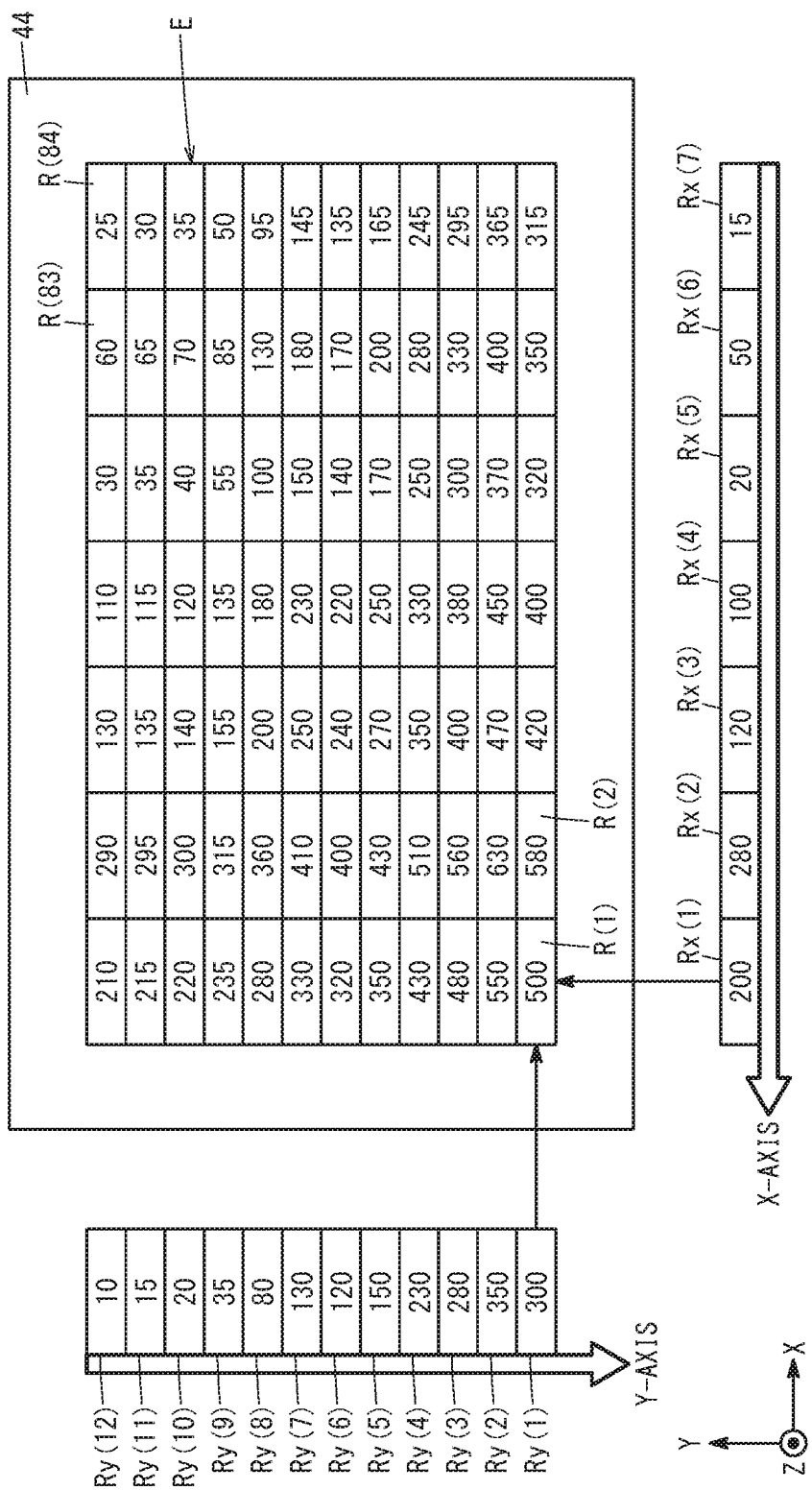
FIG. 15 is a diagram for explaining a method of calculating wire electrode moving time indexes from the X-axis worktable cumulative moving time and the Y-axis worktable cumulative moving time.

FIG. 15 is a diagram for explaining a method of calculating the wire electrode moving time index from the X-axis worktable cumulative moving time and the Y-axis worktable cumulative moving time. The moving time index calculator 118 divides the movable range (movable range E) in which the wire electrode 12 can move relative to the worktable 44, into wire electrode moving regions R(1) to R(84) that correspond to the worktable moving regions Rx(1) to Rx(7) with respect to the X-axis direction and correspond to the worktable moving regions Ry(1) to Ry(12) with respect to the Y-axis direction. It should be noted that the movement of the wire electrode 12 relative to the worktable 44 and the movement of the worktable 44 are opposite. Therefore, in FIG. 15 the directions of the X-axis and the Y-axis indicating the moving direction of the wire electrode 12 in the worktable 44 and the directions of the X-axis and the Y-axis indicating the moving direction of the worktable 44 are opposite.

The wire electrode moving time index for one specific region among the wire electrode moving regions R(1) to R(84) can be obtained as the sum of the X-axis worktable cumulative moving time in the region Rx (one of the worktable moving regions Rx(1) to Rx(7)) corresponding to the aforementioned specific region and the Y-axis worktable cumulative moving time in the region Ry (one of the worktable moving regions Ry(1) to Ry(12)) corresponding to the aforementioned specific region. More specifically, the wire electrode moving time index of the wire electrode moving region R(1) is calculated as "500" by adding up the X-axis worktable cumulative moving time "200" for the worktable moving region Rx(1) and the Y-axis worktable cumulative moving time "300" for the worktable moving region Ry(1).

Display of Wire Electrode Moving Time Index

In the present embodiment, the wire electrode moving time index for each of the wire electrode moving regions R(1) to R(84) is displayed on the display unit 120.

Figure 16:
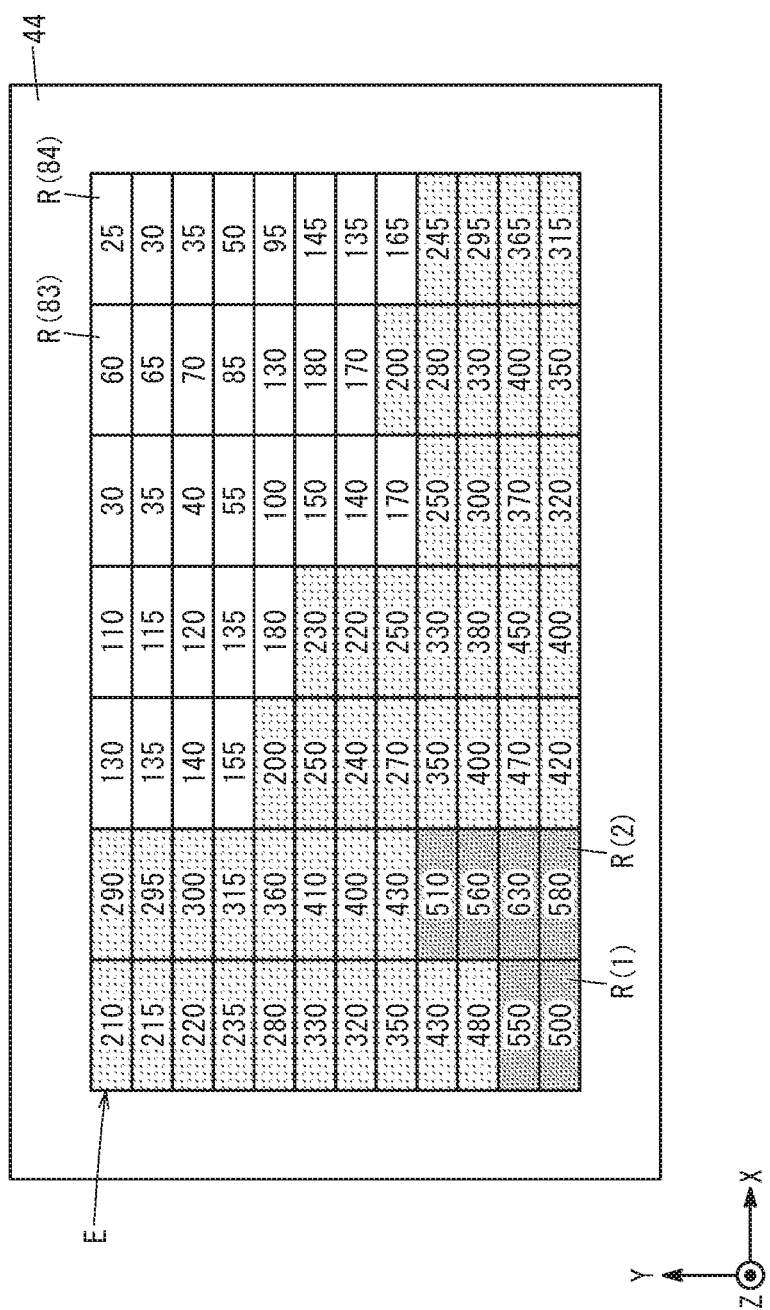
FIG. 16 is a diagram showing a display example of wire electrode moving time indexes in respective wire electrode moving regions displayed on the display unit.

FIG. 16 is a diagram showing a display example of wire electrode moving time indexes in respective wire electrode moving regions R(1) to R(84) displayed on the display unit 120. As shown in FIG. 16, a map showing the locations of the wire electrode moving regions R(1) to R(84) relative to the worktable 44 is depicted on the display unit 120 so as to display the wire electrode cumulative moving time index in each of wire electrode moving regions R(1) to R(84). Further, the display is changed based on the value of the wire electrode cumulative moving time index. For example, among the wire electrode moving regions R(1) to R(84), those (the range indicated by the dense dots in FIG. 16) having a wire electrode cumulative moving time index of "500" or greater are displayed with red background while those (the range indicated by the thin dots in FIG. 16) having a wire electrode cumulative moving index of "200" or greater are displayed with yellow background.

Display Notification Control Process

Figure 17:
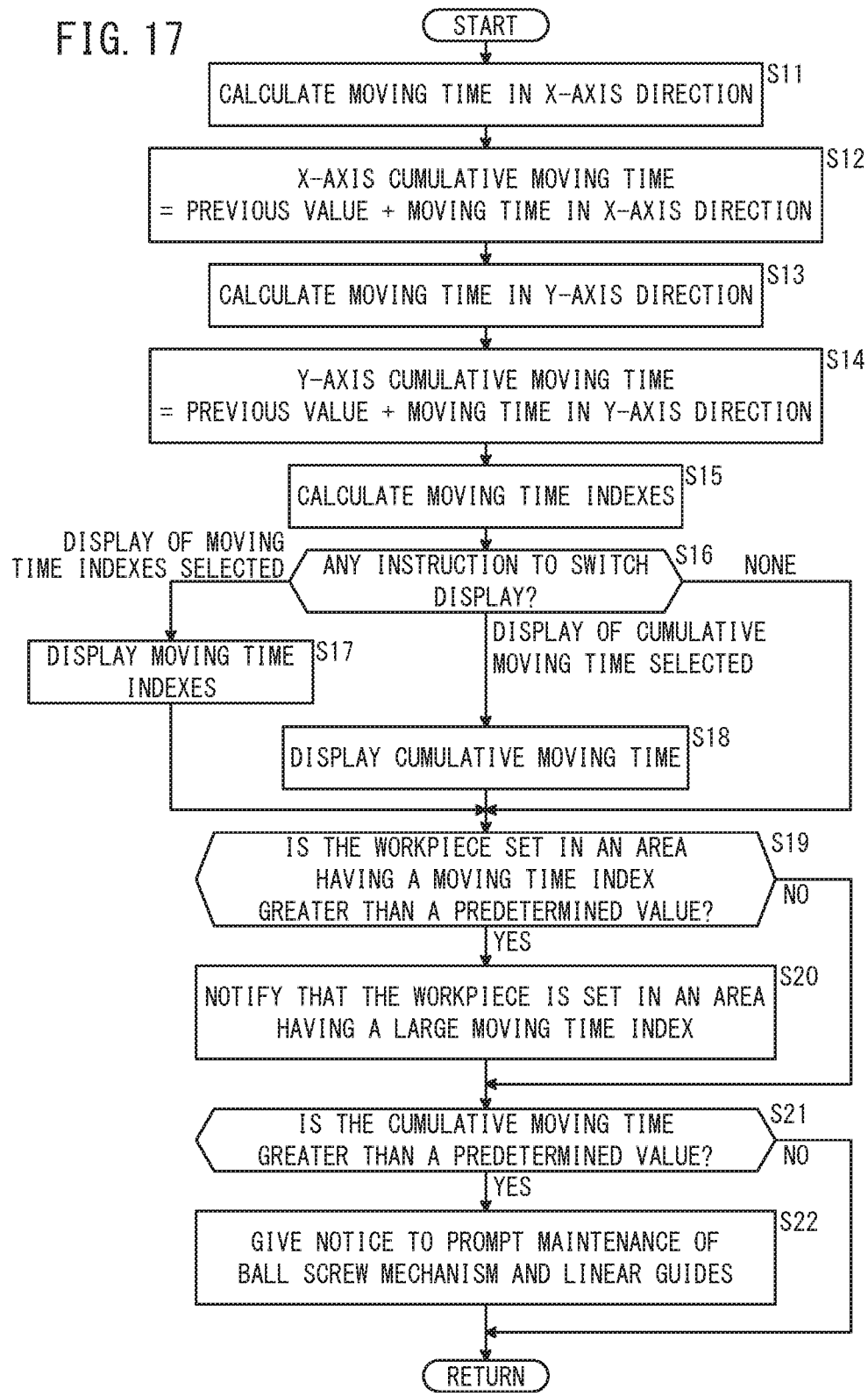
FIG. 17 is a flow chart showing a processing flow of display on a display unit and notification by a notification unit, performed in a controller.

FIG. 17 is a flowchart showing a processing flow of display on the display unit 120 and notification by the notification unit 122, performed in the control device 90. At step S11, the X-axis cumulative moving time calculator 114 calculates the X-axis worktable moving time in each of the worktable moving regions Rx(1) to Rx(7), then the control goes to step S12. At step S12, the X-axis cumulative moving time calculator 114 calculates the sum of the previous X-axis worktable cumulative moving time for each of worktable moving regions Rx(1) to Rx(7) and the X-axis worktable moving time in each of the worktable moving regions Rx(1) to Rx(7) as a new X-axis worktable cumulative moving time, and the control goes to step S13.

At step S13, the Y-axis cumulative moving time calculator 116 calculates the Y-axis worktable moving time in each of the worktable moving regions Ry(1) to Ry(12), then the control goes to step S14. At step S14, the Y-axis cumulative moving time calculator 116 calculates the sum of the previous Y-axis worktable cumulative moving time for each of worktable moving regions Ry(1) to Ry(12) and the Y-axis worktable moving time in each of the worktable moving regions Ry(1) to Ry(12) as a new Y-axis worktable cumulative moving time, and the control goes to step S15. At step S15, the moving time index calculator 118 calculates the wire electrode moving time indexes of respective wire electrode moving regions R(1) to R(84) relative to the worktable 44, and the control goes to step S16.

At step S16, the display control unit 104 determines whether or not an unillustrated display changeover switch is operated by the operator to display the wire electrode moving time indexes or the worktable cumulative moving time. When display of the wire electrode moving time indexes is selected by the display switch, the control goes to step S17. When display of the worktable cumulative moving time is selected, the control proceeds to step S18. When none of them are selected, the control proceeds to step S19.

At step S17, the display control unit 104 outputs a command signal that causes the display unit 120 to display wire electrode moving time indexes in the map showing the locations of wire electrode moving regions R(1) to R(84) as shown in FIG. 16, and then the control goes to step S19. At step S18, the display control unit 104 outputs a command signal that causes the display unit 120 to display X-axis worktable cumulative moving time in the map showing the locations of the worktable moving regions Rx(1) to Rx(7) and display Y-axis worktable cumulative moving time in the map showing the locations of the worktable moving regions Ry(1) to Ry(12), as shown in FIG. 14, and then the control proceeds to step S19.

At step S19, the notification control unit 106 receives information on the set position of the workpiece W on the worktable 44 calculated by the workpiece set position analyzer 102, and determines whether or not the workpiece W is set on the worktable 44 in an area where the wire electrode cumulative moving time index is equal to or greater than a predetermined value (for example, "500"). When the workpiece W is set on the worktable 44 in the area where the wire electrode cumulative moving time index is equal to or greater than the predetermined value, the control goes to step S20. When the workpiece W is set on the worktable 44 in an area other than the area where wire electrode cumulative moving time is equal to or greater than the predetermined value, the control goes to step S21.

At step S20, the notification control unit 106 outputs a command signal to the notification unit 122 so as to inform the operator that the workpiece W has been set on the worktable 44 in an area where the wire electrode moving time indexes of the worktable 44 are high, then, the control proceeds to step S21.

At step S21, the notification control unit 106 determines whether or not there is any value that is equal to or above a predetermined value (e.g., "400") among the X-axis worktable cumulative moving time of worktable moving regions Rx(1) to Rx(7) or among the Y-axis worktable cumulative moving time of worktable moving region Ry(1) to Ry(12). When any one of the worktable cumulative moving time is equal to or above the predetermined value, the control goes to step S22. When all the worktable cumulative moving time are lower than the predetermined value, the control is terminated.

At step S22, the notification control unit 106 outputs a command signal so as to cause the notification unit 122 to prompt the operator to perform maintenance work on the ball screw mechanisms 52, 76 and the linear guides 64, 66, before termination of the control.

Operation and Effect

In the present embodiment, the wire electrode moving time index is calculated in correlation with the value of wire electrode cumulative moving time for which the wire electrode 12 has moved within each of the wire electrode moving regions R(1) to R(84) in the worktable 44. The thus calculated wire electrode moving time indexes for wire electrode moving regions R(1) to R(84) are displayed in a map showing the locations of the wire electrode moving regions R(1) to R(84), on the display unit 120.

Accordingly, it is possible to offer the operator the information on the wire electrode moving time indexes for the wire electrode moving regions R(1) to R(84) through the display on the display unit 120. Further, the display on the display unit 120 can offer the operator the information on the distribution of the areas where the wire electrode cumulative moving time is long and the areas where the wire electrode cumulative moving time is short in an easy-to-understand manner. As a result, the operator, as checking the display on the display unit 120, can set the workpiece W in the area where the wire electrode moving time indexes are low, whereby it is possible to reduce local unevenness of the wire electrode moving time index for every region. Thus, it is possible to suppress the wear of specific areas in the screw shafts 56, 80 and the guide rails 50, 74 from being accelerated.

Further, in the present embodiment, the display unit 120 displays the wire electrode moving regions R(1) to R(84) each containing a wire electrode moving time index, with different background colors depending on the value of wire electrode moving index. Thus, it is possible to offer the operator the information on the distribution of the areas where the wire electrode cumulative moving time is long and short so that the operator can grasp it at a glance.

Moreover, in the present embodiment, when the workpiece W is set on the worktable 44 in an area where the wire electrode moving time index is equal to or higher than a predetermined value, the notification unit 122 notifies the operator of this fact. Thus, it is possible to alert the operator, or make the operator recognize that the workpiece W has been placed in an area where the value of wire electrode cumulative moving time is high.

In the present embodiment, the wire electrode moving time index correlated with the wire electrode cumulative moving time is determined from the X-axis worktable cumulative moving time and the Y-axis worktable cumulative moving time. Since the wire electrode moving time index can be obtained from the X-axis worktable cumulative moving time and Y-axis worktable cumulative moving time which have been once obtained, it is possible to suppress the processing load on the operation processing unit 94 as compared with the case where the wire electrode cumulative moving time is directly computed from the amount of rotation of the X-axis motor 78 detected by the X-axis resolver 86 and the amount of rotation of the Y-axis motor 54 detected by the Y-axis resolver 62.

Further, in the present embodiment, the display unit 120 is configured to display a map showing the locations of the worktable moving regions Rx(1) to Rx(7) and Ry(1) to Ry(12), in which the worktable cumulative moving time for worktable moving regions Rx(1) to Rx(7), Ry(1) to Ry(12) are displayed respectively. As a result, the worktable cumulative moving time can be displayed on the display unit 120 at the position corresponding to the moving position of the worktable 44. Thereby, it is possible to offer the operator the information on the distribution of the areas where the worktable cumulative moving time is long or short in an easy-to-understand manner.

Further, in the present embodiment, the worktable moving time is corrected according to the moving acceleration of the worktable 44. The screw shafts 56, 80 and the guide rails 50, 74 wear more quickly when the worktable 44 is moved with acceleration or deceleration than the case where the worktable 44 is moved at constant speed. That is, this configuration reflects this fact and makes it possible to produce values in conformity with worktable cumulative moving time and the abrasion conditions of the screw shafts 56, 80 and the guide rails 50, 74.

Furthermore, in this embodiment, when any one of the X-axis worktable cumulative moving time in the worktable moving regions Rx(1) to Rx(7) or any one of the Y-axis worktable cumulative moving time in the worktable moving regions Ry(1) to Ry(12) is equal to or above the predetermined value, the notification unit 122 gives notice to prompt the operator to perform maintenance on the ball screw mechanisms 52, 76 and the linear guides 64, 66. Thus, it is possible to provide information to the operator that the ball screw mechanisms 52, 76 and the linear guides 64, 66 need maintenance.

Third Embodiment

In the second embodiment, the X-axis worktable moving time and the Y-axis worktable moving time are corrected according to the moving acceleration of the worktable 44. In the third embodiment, the X-axis worktable moving time and the Y-axis worktable moving time are corrected according to the weight of the workpiece W, the amount of the dielectric working fluid and moving position of the worktable 44, in addition to the moving acceleration of the worktable 44.

Figure 18:
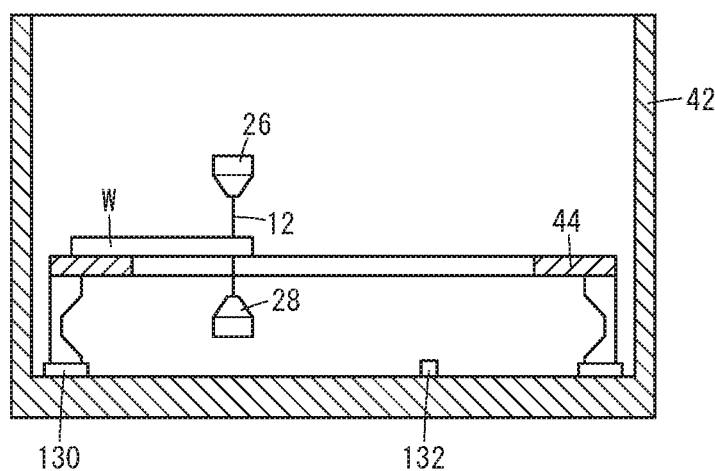
FIG. 18 is a schematic diagram showing the internal configuration of a work-pan.

FIG. 18 is a schematic diagram showing the internal configuration of the work-pan 42. Arranged at the leg of the worktable 44 is a load cell 130. The load cell 130 measures the weight of the workpiece W placed on the worktable 44. A water gauge 132 is provided at the bottom of the work-pan 42. The water gauge 132 measures the amount of the working fluid stored in the work-pan 42.

The X-axis cumulative moving time calculator 114 and the Y-axis cumulative moving time calculator 116 correct the X-axis worktable moving time and the Y-axis worktable moving time according to the weight of the workpiece W placed on the worktable 44. The coefficients for correction as to the weight of the workpiece W are set at "1.0" for a workpiece having a weight of 0 [kg] to less than 10 [kg], "1.1" for a workpiece having a weight of 10 [kg] to less than 50 [kg], "1.5" for a workpiece having a weight of 50 [kg] to less than 200 [kg] and at "3.0" for a workpiece having a weight of 200 [kg] or heavier.

Further, the X-axis cumulative moving time calculator 114 and the Y-axis cumulative moving time calculator 116 correct the X-axis worktable moving time and the Y-axis worktable moving time according to the amount of working fluid in the work-pan 42. The coefficients for correction as to the amount of working fluid are set at "1.0" when the working fluid is stored in an amount of 0 [l] to less than 10 [l], "1.1" when in an amount of 10 [l] to less than 50 [l], "1.5" when the amount of working fluid is in an amount of 50 [l] to less than 200 [l] and "3.0" when in an amount of 200 [l] or greater.

Furthermore, the X-axis cumulative moving time calculator 114 and the Y-axis cumulative moving time calculator 116 correct the X-axis worktable moving time and the Y-axis worktable moving time according to the moving position of the worktable 44. Correction based on the moving position of the worktable 44 is made according to the distance deviation of the worktable 44 from the center point where the nut 84 of the X-axis ball screw mechanism 76 is positioned at the center of the screw shaft 80 with respect to the X-axis direction and the nut 60 of the Y-axis ball screw mechanism 52 is positioned at the center of the screw shaft 56 with respect to the Y-axis direction. For example, the coefficient for correction is set at "1.0" when the distance deviation is from 0 [mm] to less than 100 [mm], "2.0" for a distance deviation of 100 [mm] to less than 200 [mm], "3.0" for a distance deviation of 200 [mm] to less than 300 [mm], and "5.0" for a distance deviation of 300 [mm] or greater.

Operation and Effect

In the present embodiment, the worktable moving time is corrected according to the weight of the workpiece W placed on the worktable 44. As the workpiece W is heavier, the screw shafts 56, 80 and the guide rails 50, 74 are worn faster. That is, this configuration reflects this fact and makes it possible to produce values in conformity with worktable cumulative moving time and the abrasion conditions of the screw shafts 56, 80 and the guide rails 50, 74.

Further, in the present embodiment, the worktable moving time is corrected according to the amount of working fluid stored in the work-pan 42. As the amount of the working fluid in the work-pan 42 increases, the screw shafts 56, 80 and the guide rails 50, 74 are worn faster. That is, this configuration reflects this fact and makes it possible to produce values in conformity with worktable cumulative moving time and the abrasion conditions of the screw shafts 56, 80 and the guide rails 50, 74.

Furthermore, in the present embodiment, the worktable moving time is corrected according to the moving position of the worktable 44 relative to the screw shafts 56, 80 and the guide rails 50, 74. When the worktable 44 is positioned on both end sides of the screw shafts 56, 80 and the guide rails 50, 74, the screw shafts 56, 80 and the guide rails 50, 74 are worn fast. That is, this configuration reflects this fact and makes it possible to produce values in conformity with worktable cumulative moving time and the abrasion conditions of the screw shafts 56, 80 and the guide rails 50, 74.

Other Embodiments

Although the present invention has been described with reference to the embodiments, the technical scope of the present invention should not be limited to the scope described in the above embodiments. It goes without saying that various modifications and/or improvements can be added to the above embodiments. It is obvious from the description of the scope of the claims that modes with such modifications and/or improvements can be included in the technical scope of the present invention.

For example, the wire electrical discharge machine 10 of the above embodiments is a type that causes the worktable 44 to move relative to the wire electrode 12, but the present invention can also be applied to a so-called column type wire electrical discharge machine in which the worktable 44 is fixed while the wire electrode 12 is moved.

Further, in the above-described embodiment, each of the wire electrode moving regions R(1) to R(84) for displaying the wire electrode cumulative moving time or the wire electrode moving time index is configured to be tinted with a different background color depending on the value of wire electrode cumulative moving time or the value of the wire electrode moving time index). Instead of the background, the font color of the wire electrode cumulative moving time or the wire electrode moving time index may be changed. Further, instead of displaying the wire electrode cumulative moving time or the wire electrode moving time index itself, only the background may be tinted with a different color according to the wire electrode cumulative moving time or the wire electrode moving time index.

Further, in the above embodiment, a speaker is used as an example of the notification unit 122 so as to notify the operator by voice sound or the like. The notification unit 122 is not limited to a speaker, but may employ a device for making an appeal to an operator's visual sensation such as a liquid crystal display, an electric display board or a light.

As to the correction to the X-axis worktable moving time and the Y-axis worktable moving time based on the moving acceleration of the worktable 44, the weight of workpiece W, the amount of working fluid and the position of the worktable 44 described in the second and third embodiments, the correcting schemes may be used solo or in combination to correct the X-axis worktable moving time and the Y-axis worktable moving time.

Technical Idea Obtained from the Embodiments

Now, technical ideas that can be grasped from the above embodiment will be described hereinbelow.

The wire electrical discharge machine (10) for implementing electrical discharge machining on a workpiece (W)

by applying voltage across an electrode gap formed between the wire electrode (12) and the workpiece (W) to generate electric discharge, includes: the worktable (44) on which the workpiece (W) is set; the drive mechanism (52, 64, 66, 76) configured to relatively move the wire electrode (12) and the worktable (44); the wire electrode cumulative moving time calculator (100, 118) configured to calculate a value correlated to a wire electrode cumulative moving time as a cumulative value of time for which the wire electrode (12) has moved in each of wire electrode moving regions (R(1) to R(84)) which are defined by dividing the movable range of the wire electrode (12) moving relative to the worktable (44) into multiple wire electrode moving regions (R(1) to R(84)); and the display control unit (104) configured to display on a display unit (120) the information on values correlated to the wire electrode cumulative moving time for the respective wire electrode moving regions (R(1) to R(84)). This configuration makes it possible to provide the operator the information on the value correlated to the wire electrode cumulative moving time for each of wire electrode moving regions (R(1) to R(84)).

In the above wire electrical discharge machine (10), the display control unit (104) may be configured to cause the display unit (120) to display a map showing the locations of the multiple wire electrode moving regions (R(1) to R(84)) on the worktable (44) and display the information on the values correlated to the wire electrode cumulative moving time for the wire electrode moving regions (R(1) to R(84)), in the displayed positions of the multiple wire electrode moving regions (R(1) to R(84)) on the map. As a result, it is possible to offer the operator the information on the distribution of the areas where the values of the wire electrode cumulative moving time are high and low, by easy-to-understand display for the operator.

In the above wire electrical discharge machine (10), the display control unit (104) may be configured to display the information on the values correlated to the wire electrode cumulative moving time less than a first predetermined value in a color different from that for the information on the values correlated to the wire electrode cumulative moving time equal to or greater than the first predetermined value. As a result, it is possible to offer the operator the information on the distribution of the areas where the values of the wire electrode cumulative moving time are high and low, by display that allows the operator to grasp it at a glance.

The above wire electrical discharge machine (10) may further include: a workpiece set position acquisition unit (102) configured to acquire information correlated to the position where the workpiece (W) is set on the worktable (44); and a notification control unit (106) configured to notify a notification unit (122) of the fact when the workpiece (W) happens to be set in any of the wire electrode moving regions (R(1) to R(84)) having a wire electrode cumulative moving time equal to or greater than a second predetermined value. As a result, it is possible to notify the operator so that he/she can recognize that the workpiece (W) has been set in an area where the wire electrode cumulative moving time is high.

In the above wire electrical discharge machine (10), the drive mechanism (52, 64, 66, 76) may be configured to move the worktable (44), and the wire electrical discharge machine may further include: a moving position acquisition unit (108) configured to acquire information correlated to the moving position of the worktable (44) moved by the drive mechanism (52, 64, 66, 76); a moving speed acquisition unit (110) configured to acquire information correlated to the moving speed of the worktable (44) moved by the drive mechanism (52, 64, 66, 76); and a worktable cumulative moving time calculator (114, 116) configured to calculate a worktable cumulative moving time as a cumulative value of time for which the wire worktable (44) has moved in each of worktable moving regions (Rx(1) to Rx(7), Ry(1) to Ry(12)) which are defined by dividing the moving range of the worktable (44) moved by the drive mechanism (52, 64, 66, 76), from the information correlated to the moving position and the moving speed of the worktable (44). In this configuration, the wire electrode cumulative moving time calculator (118) may be configured to calculate a value correlated to the wire electrode cumulative moving time, based on the worktable cumulative moving time for each of the worktable moving regions (Rx(1) to Rx(7), Ry(1) to Ry(12)). Since the worktable cumulative moving time is once calculated, then the value correlated to the wire electrode moving time value is calculated based on the worktable cumulative moving time, it is possible to suppress the processing load on the wire electrode cumulative time calculator (118).

In the above wire electrical discharge machine (10), the display control unit (104) may be configured to cause the display unit (120) to display a map showing the locations of the worktable moving regions (Rx(1) to Rx(7), Ry(1) to Ry(12)) and display the cumulative moving time of the worktable in the displayed worktable moving regions (Rx(1) to Rx(7), Ry(1) to Ry(12)) on the map. This configuration makes it possible to offer the operator the information on the distribution of the areas where the values of the wire electrode cumulative moving time are high and low, by easy-to-understand display for the operator.

The above wire electrical discharge machine (10) may further include an acceleration acquisition unit (112) configured to acquire information correlated to the moving acceleration of the worktable (44) moved by the drive mechanism (52, 64, 66, 76), and the worktable cumulative moving time calculator (114, 116) may be configured to correct the moving time of the worktable (44) in each of the worktable moving regions (Rx(1) to Rx(7), Ry(1) to Ry(12)) according to the information correlated to the moving acceleration of the worktable (44)). As a result, it is possible to obtain values in conformity with the worktable cumulative moving time and the abrasion conditions of the drive mechanism (52, 64, 66, 76)

The above wire electrical discharge machine (10) may further include a workpiece weight acquisition unit (130) for acquiring information correlated to the weight of the workpiece (W), wherein the worktable cumulative moving time calculator (114, 116) is configured to correct the moving time of the worktable (44) in each of the worktable moving regions (Rx(1) to Rx(7), Ry(1) to Ry(12)) according to the information correlated to the weight of the workpiece (W). As a result, it is possible to obtain values that reflect the worktable cumulative moving time and the progress of wear of the drive mechanism (52, 64, 66, 76).

The above wire electrical discharge machine (10) may further include: a work-pan (42) accommodating the worktable (44) and storing a working fluid; and a working fluid amount acquisition unit (132) configured to acquire information correlated to the amount of the working fluid in the work-pan (42), the drive mechanism (52, 64, 66, 76) may be configured to drive the worktable (44) together with the work-pan (42), and the worktable cumulative moving time calculator (114, 116) may be configured to correct the moving time of the worktable (44) in each of the worktable moving regions (Rx(1) to Rx(7), Ry(1) to Ry(12)) according to information correlated to the amount of the working fluid.

As a result, it is possible to obtain values that reflect the worktable cumulative moving time and the progress of wear of the drive mechanism (52, 64, 66, 76).

In the above wire electrical discharge machine (10), the worktable cumulative moving time calculator (114, 116) may be configured to correct the moving time of the worktable (44) in each of the worktable moving regions (Rx(1) to Rx(7), Ry(1) to Ry(12)) according to the moving position of the worktable (44) relative to the drive mechanism (52, 64, 66, 76). As a result, it is possible to obtain values that reflect the worktable cumulative moving time and the progress of wear of the drive mechanism (52, 64, 66, 76).

The above wire electrical discharge machine (10) may further include a notification control unit (106) configured to cause a notification unit (122) to prompt an operator to maintain the drive mechanism (52, 64, 66, 76) when the worktable cumulative moving time in any one of the worktable moving regions (Rx(1) to Rx(7), Ry(1) to Ry(12)) reaches a third predetermined value or greater. As a result, it is possible to offer the operator the information that the drive mechanism (52, 64, 66, 76) needs maintenance.

A display method for displaying information on a wire electrical discharge machine (10) including a wire electrode (12) for generating electrical discharge under application of voltage across an electrode gap formed between itself and a workpiece (W); a worktable (44) on which the workpiece (W) is set; and a drive mechanism (52, 64, 66, 76) for relatively moving the wire electrode (12) and the worktable (44), includes: a wire electrode cumulative moving time calculating step of calculating a value correlated to a wire electrode cumulative moving time as a cumulative value of time for which the wire electrode (12) has moved in each of wire electrode moving regions (R(1) to R(84)) which are defined by dividing the movable range of the wire electrode (12) moving relative to the worktable (44) into multiple wire electrode moving regions (R(1) to R(84)); and a display control step of displaying on the display unit (120) the information on values correlated to the wire electrode cumulative moving time for respective wire electrode moving regions (R(1) to R(84)). As a result, it is possible to provide the operator the information on the value correlated to the wire electrode cumulative moving time for each of wire electrode moving regions (R(1) to R(84)).

What is claimed is:

1. A wire electrical discharge machine for implementing electrical discharge machining on a workpiece by applying voltage across an electrode gap formed between a wire electrode and the workpiece to generate electric discharge, comprising:
    a worktable on which the workpiece is set;
    a drive mechanism configured to relatively move the wire electrode and the worktable;
    a wire electrode cumulative moving time calculator configured to calculate a value correlated to a wire electrode cumulative moving time as a cumulative value of time for which the wire electrode has moved in each of wire electrode moving regions which are defined by dividing a movable range of the wire electrode moving relative to the worktable into multiple wire electrode moving regions; and
    a display control unit configured to display on a display unit information on values correlated to the wire electrode cumulative moving time for the respective wire electrode moving regions.

2. The wire electrical discharge machine according to claim 1, wherein the display control unit is configured to cause the display unit to display a map showing locations of the multiple wire electrode moving regions on the worktable and display the information on the values correlated to the wire electrode cumulative moving time for the wire electrode moving regions, in displayed positions of the multiple wire electrode moving regions on the map.

3. The wire electrical discharge machine according to claim 1, wherein the display control unit is configured to display the information on the values correlated to the wire electrode cumulative moving time less than a first predetermined value in a color different from that for the information on the values correlated to the wire electrode cumulative moving time equal to or greater than the first predetermined value.

4. The wire electrical discharge machine according to claim 1, further comprising:
    a workpiece set position acquisition unit configured to acquire information correlated to a position where the workpiece is set on the worktable; and
    a notification control unit configured to notify a notification unit of the fact when the workpiece happens to be set in any of the wire electrode moving regions having a wire electrode cumulative moving time equal to or greater than a second predetermined value.

5. The wire electrical discharge machine according to claim 1, wherein the drive mechanism is configured to move the worktable, further comprising:
    a moving position acquisition unit configured to acquire information correlated to a moving position of the worktable moved by the drive mechanism;
    a moving speed acquisition unit configured to acquire information correlated to a moving speed of the worktable moved by the drive mechanism; and
    a worktable cumulative moving time calculator configured to calculate a worktable cumulative moving time as a cumulative value of time for which the wire worktable has moved in each of worktable moving regions which are defined by dividing a moving range of the worktable moved by the drive mechanism, from the information correlated to the moving position and the moving speed of the worktable,
    wherein the wire electrode cumulative moving time calculator is configured to calculate a value correlated to the wire electrode cumulative moving time, based on the worktable cumulative moving time for each of the worktable moving regions.

6. The wire electrical discharge machine according to claim 5, wherein the display control unit is configured to cause the display unit to display a map showing the locations of the worktable moving regions and display the cumulative moving time of the worktable in the displayed worktable moving regions on the map.

7. The wire electrical discharge machine according to claim 5, further comprising an acceleration acquisition unit configured to acquire information correlated to moving acceleration of the worktable moved by the drive mechanism, wherein the worktable cumulative moving time calculator is configured to correct the moving time of the worktable in each of the worktable moving regions according to the information correlated to the moving acceleration of the worktable.

8. The wire electrical discharge machine according to claim 5, further comprising a workpiece weight acquisition unit for acquiring information correlated to a weight of the workpiece, wherein the worktable cumulative moving time calculator is configured to correct the moving time of the worktable in each of the worktable moving regions according to information correlated to the weight of the workpiece.

9. The wire electrical discharge machine according to claim 5, further comprising:
- a work-pan accommodating the worktable and storing a working fluid; and
- a working fluid amount acquisition unit configured to acquire information correlated to an amount of the working fluid in the work-pan, wherein:
- the drive mechanism is configured to drive the worktable together with the work-pan; and
- the worktable cumulative moving time calculator is configured to correct the moving time of the worktable in each of the worktable moving regions according to information correlated to the amount of the working fluid.

10. The wire electrical discharge machine according to claim 5, wherein the worktable cumulative moving time calculator is configured to correct the moving time of the worktable in each of the worktable moving regions according to a moving position of the worktable relative to the drive mechanism.

11. The wire electrical discharge machine according to claim 5, further comprising a notification control unit configured to cause a notification unit to prompt an operator to maintain the drive mechanism when the worktable cumulative moving time in any one of the worktable moving regions reaches a third predetermined value or greater.

12. A display method for displaying information on a wire electrical discharge machine including a wire electrode for generating electrical discharge under application of voltage across an electrode gap formed between itself and a workpiece; a worktable on which the workpiece is set; and a drive mechanism for relatively moving the wire electrode and the worktable, comprising:
- a wire electrode cumulative moving time calculating step of calculating a value correlated to a wire electrode cumulative moving time as a cumulative value of time for which the wire electrode has moved in each of wire electrode moving regions which are defined by dividing a movable range of the wire electrode moving relative to the worktable into multiple wire electrode moving regions; and
- a display control step of displaying on a display unit information on values correlated to the wire electrode cumulative moving time for respective wire electrode moving regions.

* * * * *